(12) United States Patent
Nakai et al.

(10) Patent No.: US 11,124,262 B2
(45) Date of Patent: Sep. 21, 2021

(54) ADAPTER FOR DISC BRAKE CALIPER OF HUMAN-POWERED VEHICLE

(71) Applicant: SHIMANO INC., Sakai (JP)

(72) Inventors: Mototsugu Nakai, Sakai (JP); Kazuya Kuwayama, Sakai (JP)

(73) Assignee: SHIMANO INC., Sakai (JP)

( * ) Notice: Subject to any disclaimer, the term of this patent is extended or adjusted under 35 U.S.C. 154(b) by 2 days.

(21) Appl. No.: 16/393,931

(22) Filed: Apr. 24, 2019

(65) Prior Publication Data
US 2020/0339217 A1    Oct. 29, 2020

(51) Int. Cl.
| F16D 55/225 | (2006.01) |
| B62L 1/00 | (2006.01) |
| F16D 65/00 | (2006.01) |
| F16D 55/00 | (2006.01) |

(52) U.S. Cl.
CPC ............ B62L 1/005 (2013.01); F16D 55/225 (2013.01); F16D 65/0056 (2013.01); *F16D 2055/0008* (2013.01)

(58) Field of Classification Search
CPC .... B62L 1/005; F16D 55/225; F16D 65/0056; F16D 2055/0008
See application file for complete search history.

(56) References Cited

U.S. PATENT DOCUMENTS

| 4,279,214 | A | * | 7/1981 | Thorn | F16D 66/02 |
| | | | | | 116/208 |
| 4,945,818 | A | * | 8/1990 | Ware | B60T 17/083 |
| | | | | | 116/208 |
| 5,133,265 | A | * | 7/1992 | Lahti | A47B 53/00 |
| | | | | | 105/101 |
| 5,178,092 | A | * | 1/1993 | Schedin | F16D 66/02 |
| | | | | | 116/208 |
| 6,457,566 | B1 | * | 10/2002 | Toby | F16D 65/12 |
| | | | | | 188/1.11 W |
| 7,055,655 | B2 | * | 6/2006 | Takizawa | F16B 43/005 |
| | | | | | 188/18 A |
| 7,222,699 | B2 | * | 5/2007 | Salazar | F16D 66/02 |
| | | | | | 188/1.11 W |
| 7,963,373 | B2 | * | 6/2011 | Salazar | F16D 66/00 |
| | | | | | 188/1.11 R |
| 8,387,758 | B1 | * | 3/2013 | Sawyer | B60T 17/221 |
| | | | | | 188/1.11 L |
| 2005/0252727 | A1 | * | 11/2005 | England | F16D 65/568 |
| | | | | | 188/1.11 L |
| 2015/0001012 | A1 | | 1/2015 | Noborio et al. | |
| 2015/0001014 | A1 | | 1/2015 | Noborio et al. | |
| 2015/0210345 | A1 | | 7/2015 | Noborio et al. | |
| 2015/0308524 | A1 | | 10/2015 | Nakakura | |

\* cited by examiner

*Primary Examiner* — Xuan Lan Nguyen
(74) *Attorney, Agent, or Firm* — Mori & Ward, LLP

(57) ABSTRACT

An adapter body is configured to be attached to a vehicle body in each of a first orientation in which a caliper body is coupled to the vehicle body via the adapter body in a first position corresponding to a first disc brake rotor having a first outer diameter, and a second orientation in which the caliper body is coupled to the vehicle body via the adapter body in a second position corresponding to a second disc brake rotor having a second outer diameter different from the first outer diameter. The indicator is configured to indicate an correspondence between an orientation of the adapter body and at least one of the first disc brake rotor and the second disc brake rotor.

23 Claims, 16 Drawing Sheets

ADAPTER FOR DISC BRAKE CALIPER OF HUMAN-POWERED VEHICLE

BACKGROUND OF THE INVENTION

Field of the Invention

The present invention relates to an adapter for a disc brake caliper of a human-powered vehicle.

Discussion of the Background

A human-powered vehicle includes a brake device such as a brake caliper.

SUMMARY OF THE INVENTION

In accordance with a first aspect of the present invention, an adapter for a disc brake caliper of a human-powered vehicle comprises an adapter body and an indicator. The adapter body is configured to be attached to a vehicle body of the human-powered vehicle in each of a first orientation in which a caliper body of the disc brake caliper is coupled to the vehicle body via the adapter body in a first position corresponding to a first disc brake rotor having a first outer diameter, and a second orientation in which the caliper body of the disc brake caliper is coupled to the vehicle body via the adapter body in a second position corresponding to a second disc brake rotor having a second outer diameter different from the first outer diameter. The indicator is configured to indicate an correspondence between an orientation of the adapter body and at least one of the first disc brake rotor and the second disc brake rotor in accordance with a position of the indicator with respect to the at least one of the first disc brake rotor and the second disc brake rotor, in an attachment state where the adapter body is attached to the vehicle body.

With the adapter according to the first aspect, it is possible to attach the adapter to the vehicle frame in a proper orientation among the first orientation and the second orientation respectively corresponding to the first disc brake rotor and the second disc brake rotor.

In accordance with a second aspect of the present invention, the adapter according to the first aspect is configured so that the indicator includes a first indicator configured to indicate the correspondence between the orientation of the adapter body and the first disc brake rotor in a first attachment state where the adapter body is attached to the vehicle body in the first orientation.

With the adapter according to the second aspect, it is possible to reliably attach the adapter to the vehicle frame in a proper orientation among the first orientation and the second orientation respectively corresponding to the first disc brake rotor and the second disc brake rotor.

In accordance with a third aspect of the present invention, the adapter according to the second aspect is configured so that the adapter body includes a first surface configured to face in an axial direction with respect to a rotational axis of the first disc brake rotor and the second disc brake rotor in the attachment state. The first indicator is provided on the first surface.

With the adapter according to the third aspect, it is possible to easily visually confirm the first indicator when the adapter is attached to the vehicle body.

In accordance with a fourth aspect of the present invention, the adapter according to the second or third aspect is configured so that the adapter body includes a caliper facing surface configured to face toward the caliper body of the disc brake caliper in the attachment state. The first indicator is provided on the caliper facing surface.

With the adapter according to the fourth aspect, it is possible to easily visually confirm the first indicator when the adapter is attached to the vehicle body.

In accordance with a fifth aspect of the present invention, the adapter according to any one of the second to fourth aspects is configured so that the indicator includes a second indicator configured to indicate the correspondence between the orientation of the adapter body and the second disc brake rotor in a second attachment state where the adapter body is attached to the vehicle body in the second orientation.

With the adapter according to the fifth aspect, it is possible to more reliably attach the adapter to the vehicle frame in a proper orientation among the first orientation and the second orientation respectively corresponding to the first disc brake rotor and the second disc brake rotor.

In accordance with a sixth aspect of the present invention, an adapter for a disc brake caliper of a human-powered vehicle comprises an adapter body and an indicator. The adapter is configured to be attached to a vehicle body of the human-powered vehicle in each of a first orientation in which a caliper body of the disc brake caliper is coupled to the vehicle body via the adapter body in a first position corresponding to a first disc brake rotor having a first outer diameter, and a second orientation in which the caliper body of the disc brake caliper is coupled to the vehicle body via the adapter body in a second position corresponding to a second disc brake rotor having a second outer diameter different from the first outer diameter. The indicator is configured to indicate a correspondence between an orientation of the adapter body and at least one of the first disc brake rotor and the second disc brake rotor in an attachment state where the adapter body is attached to the vehicle body. The indicator includes a first indicator and a second indicator. The first indicator is configured to indicate the correspondence between the orientation of the adapter body and the first disc brake rotor in a first attachment state where the adapter body is attached to the vehicle body in the first orientation. The second indicator is configured to indicate the correspondence between the orientation of the adapter body and the second disc brake rotor in a second attachment state where the adapter body is attached to the vehicle body in the second orientation. A first distance is defined between the first indicator and a first center of a first mounting through-hole in the longitudinal direction. A second distance is defined between the second indicator and a second center of a second mounting through-hole in the longitudinal direction. The first distance is different from the second distance.

With the adapter according to the sixth aspect, it is possible to attach the adapter to the vehicle frame in a proper orientation among the first orientation and the second orientation respectively corresponding to the first disc brake rotor and the second disc brake rotor.

In accordance with a seventh aspect of the present invention, the adapter according to the fifth or sixth aspect is configured so that the adapter body includes a first surface and a second surface. The first surface is configured to face in an axial direction with respect to a rotational axis of the first disc brake rotor and the second disc brake rotor in the attachment state. The second surface is configured to face in the axial direction with respect to the rotational axis in the attachment state. The first indicator is provided on the first surface. The second indicator is provided on the second surface.

With the adapter according to the seventh aspect, it is possible to easily visually confirm the first indicator when the adapter is attached to the vehicle body.

In accordance with an eighth aspect of the present invention, the adapter according to any one of the fifth to seventh aspect is configured so that the adapter body includes a caliper facing surface configured to face toward the caliper body of the disc brake caliper in the attachment state. The first indicator and the second indicator are provided on the caliper facing surface.

With the adapter according to the eighth aspect, it is possible to easily visually confirm the first indicator when the adapter is attached to the vehicle body.

In accordance with a ninth aspect of the present invention, the adapter according to any one of the fifth to eighth aspects is configured so that the adapter body has a longitudinal direction. A first reference distance is defined between the first indicator and a first reference portion of the first disc brake rotor in the longitudinal direction as viewed in an axial direction with respect to the first disc brake rotor and the second disc brake rotor in a first attachment state where the adapter body is attached to the vehicle body in the first orientation. A first additional reference distance is defined between the second indicator and the first reference portion of the first disc brake rotor in the longitudinal direction as viewed in the axial direction in the first attachment state. The first reference distance is shorter than the first additional reference distance.

With the adapter according to the ninth aspect, it is possible to reliably attach the adapter to the vehicle frame in the first orientation corresponding to the first disc brake rotor.

In accordance with a tenth aspect of the present invention, the adapter according to the ninth aspect is configured so that a second reference distance is defined between the second indicator and the second reference portion of the second disc brake rotor in the longitudinal direction as viewed in the axial direction in a second attachment state where the adapter body is attached to the vehicle body in the second orientation. A second additional reference distance is defined between the first indicator and the second reference portion of the second disc brake rotor in the longitudinal direction as viewed in the axial direction in the first attachment state. The second reference distance is shorter than the second additional reference distance.

With the adapter according to the tenth aspect, it is possible to reliably attach the adapter to the vehicle frame in the second orientation corresponding to the second disc brake rotor.

In accordance with an eleventh aspect of the present invention, the adapter according to the tenth aspect is configured so that the first reference portion of the first disc brake rotor includes a first outer periphery of the first disc brake rotor. The second reference portion of the second disc brake rotor includes a second outer periphery of the second disc brake rotor.

With the adapter according to the eleventh aspect, it is possible to easily compare the first indicator with the first reference portion of the first disc brake rotor and the second indicator with the second reference portion of the second disc brake rotor.

In accordance with a twelfth aspect of the present invention, the adapter according to any one of the first to eleventh aspects is configured so that the indicator has a color different from a color of the adapter body.

With the adapter according to the twelfth aspect, it is possible to easily visually confirm the indicator when the adapter is attached to the vehicle body.

In accordance with a thirteenth aspect of the present invention, the adapter according to any one of the first to twelfth aspects is configured so that the indicator includes at least one of a projection and a recess.

With the adapter according to the thirteenth aspect, it is possible to easily visually confirm the indicator when the adapter is attached to the vehicle body.

In accordance with a fourteenth aspect of the present invention, the adapter according to any one of the first to thirteenth aspects is configured so that the adapter body has a longitudinal direction and includes a first mounting through-hole through which a first mounting member extends to couple the adapter body to the vehicle body, and a second mounting through-hole through which a second mounting member extends to couple the adapter body to the vehicle body. The second mounting through-hole is spaced apart from the first mounting through-hole in the longitudinal direction. The indicator is at least partly provided between a first center of the first mounting through-hole and a second center of the second mounting through-hole in the longitudinal direction as viewed in an axial direction with respect to the first disc brake rotor and the second disc brake rotor.

With the adapter according to the fourteenth aspect, it is possible to arrange the indicator in a position where it is possible to easily compare the indicator with the first reference portion and the second reference portion.

In accordance with a fifteenth aspect of the present invention, the adapter according to the fourteenth aspect is configured so that the indicator includes a first indicator and a second indicator. The first indicator is configured to indicate the correspondence between the orientation of the adapter body and the first disc brake rotor in a first attachment state where the adapter body is attached to the vehicle body in the first orientation. The second indicator is configured to indicate the correspondence between the orientation of the adapter body and the second disc brake rotor in a second attachment state where the adapter body is attached to the vehicle body in the second orientation. At least one of the first indicator and the second indicator is at least partly provided between the first center of the first mounting through-hole and the second center of the second mounting through-hole in the longitudinal direction as viewed in the axial direction.

With the adapter according to the fifteenth aspect, it is possible to arrange the indicator in a position where it is possible to easily compare the indicator with the first reference portion and the second reference portion.

In accordance with a sixteenth aspect of the present invention, the adapter according to the fourteenth or fifteenth aspect is configured so that the indicator includes a first indicator and a second indicator. The first indicator is configured to indicate the correspondence between the orientation of the adapter body and the first disc brake rotor in a first attachment state where the adapter body is attached to the vehicle body in the first orientation. The second indicator is configured to indicate the correspondence between the orientation of the adapter body and the second disc brake rotor in a second attachment state where the adapter body is attached to the vehicle body in the second orientation. A first distance is defined between the first indicator and the first center of the first mounting through-hole in the longitudinal direction. A second distance is defined between the second indicator and the second center of the second mounting through-hole in the longitudinal direction. The first distance is different from the second distance.

With the adapter according to the sixteenth aspect, it is possible to arrange the indicator in a position where it is possible to easily compare the indicator with the first reference portion and the second reference portion.

In accordance with a seventeenth aspect of the present invention, the adapter according to any one of the first to sixteenth aspects is configured so that the adapter body has a longitudinal direction and includes a first through-hole through which a first coupling member extends to couple the adapter body to the caliper body, and a second through-hole through which a second coupling member extends to couple the adapter body to the caliper body. The second through-hole is spaced apart from the first through-hole in the longitudinal direction. The indicator is at least partly provided between a first center of the first through-hole and a second center of the second through-hole in the longitudinal direction as viewed in an axial direction with respect to the first disc brake rotor and the second disc brake rotor.

With the adapter according to the seventeenth aspect, it is possible to arrange the indicator in a position where it is possible to easily compare the indicator with the first reference portion and the second reference portion.

In accordance with an eighteenth aspect of the present invention, the adapter according to the seventeenth aspect is configured so that the indicator includes a first indicator and a second indicator. The first indicator is configured to indicate the correspondence between the orientation of the adapter body and the first disc brake rotor in a first attachment state where the adapter body is attached to the vehicle body in the first orientation. The second indicator is configured to indicate the correspondence between the orientation of the adapter body and the second disc brake rotor in a second attachment state where the adapter body is attached to the vehicle body in the second orientation. At least one of the first indicator and the second indicator is at least partly provided between the first center of the first through-hole and the second center of the second through-hole in the longitudinal direction as viewed in the axial direction.

With the adapter according to the eighteenth aspect, it is possible to reliably arrange the indicator in a position where it is possible to easily compare the indicator with the first reference portion and the second reference portion.

In accordance with a nineteenth aspect of the present invention, the adapter according to the seventeenth or eighteenth aspect is configured so that the indicator includes a first indicator and a second indicator. The first indicator is configured to indicate the correspondence between the orientation of the adapter body and the first disc brake rotor in a first attachment state where the adapter body is attached to the vehicle body in the first orientation. The second indicator is configured to indicate the correspondence between the orientation of the adapter body and the second disc brake rotor in a second attachment state where the adapter body is attached to the vehicle body in the second orientation. A first longitudinal distance is defined between the first indicator and the first center of the first through-hole in the longitudinal direction. A second longitudinal distance is defined between the second indicator and the second center of the second through-hole in the longitudinal direction. The first longitudinal distance is substantially equal to the second longitudinal distance.

With the adapter according to the nineteenth aspect, it is possible to reliably arrange the indicator in a position where it is possible to easily compare the indicator with the first reference portion and the second reference portion.

In accordance with a twentieth aspect of the present invention, the adapter according to any one of the first to nineteenth aspects is configured so that the adapter body has a longitudinal direction and includes a first mounting through-hole through which a first mounting member extends to couple the adapter body to the vehicle body, a second mounting through-hole through which a second mounting member extends to couple the adapter body to the vehicle body, the second mounting through-hole being spaced apart from the first mounting through-hole in the longitudinal direction, a first through-hole through which a first coupling member extends to couple the adapter body to the caliper body, and a second through-hole through which a second coupling member extends to couple the adapter body to the caliper body, the second through-hole being spaced apart from the first through-hole in the longitudinal direction. The first through-hole and the second through-hole are provided between the first mounting through-hole and the second mounting through-hole in the longitudinal direction.

With the adapter according to the twentieth aspect, it is possible to arrange the indicator in a position where it is possible to easily compare the indicator with the first reference portion and the second reference portion.

In accordance with a twenty-first aspect of the present invention, the adapter according to the twentieth aspect is configured so that a first hole distance is defined between a first center of the first mounting through-hole and a first center of the first through-hole in the longitudinal direction. A second hole distance is defined between a second center of the second mounting through-hole and a second center of the second through-hole in the longitudinal direction. The first hole distance is different from the second hole distance.

With the adapter according to the twenty-first aspect, it is possible to enable the first position and the second position of the caliper body using the adapter.

In accordance with a twenty-second aspect of the present invention, the adapter according to the twenty-first aspect is configured so that a third hole distance is defined between the first center of the first through-hole and the second center of the second through-hole in the longitudinal direction. The third hole distance is different from at least one of the first hole distance and the second hole distance.

With the adapter according to the twenty-second aspect, it is possible to reliably enable the first position and the second position of the caliper body using the adapter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
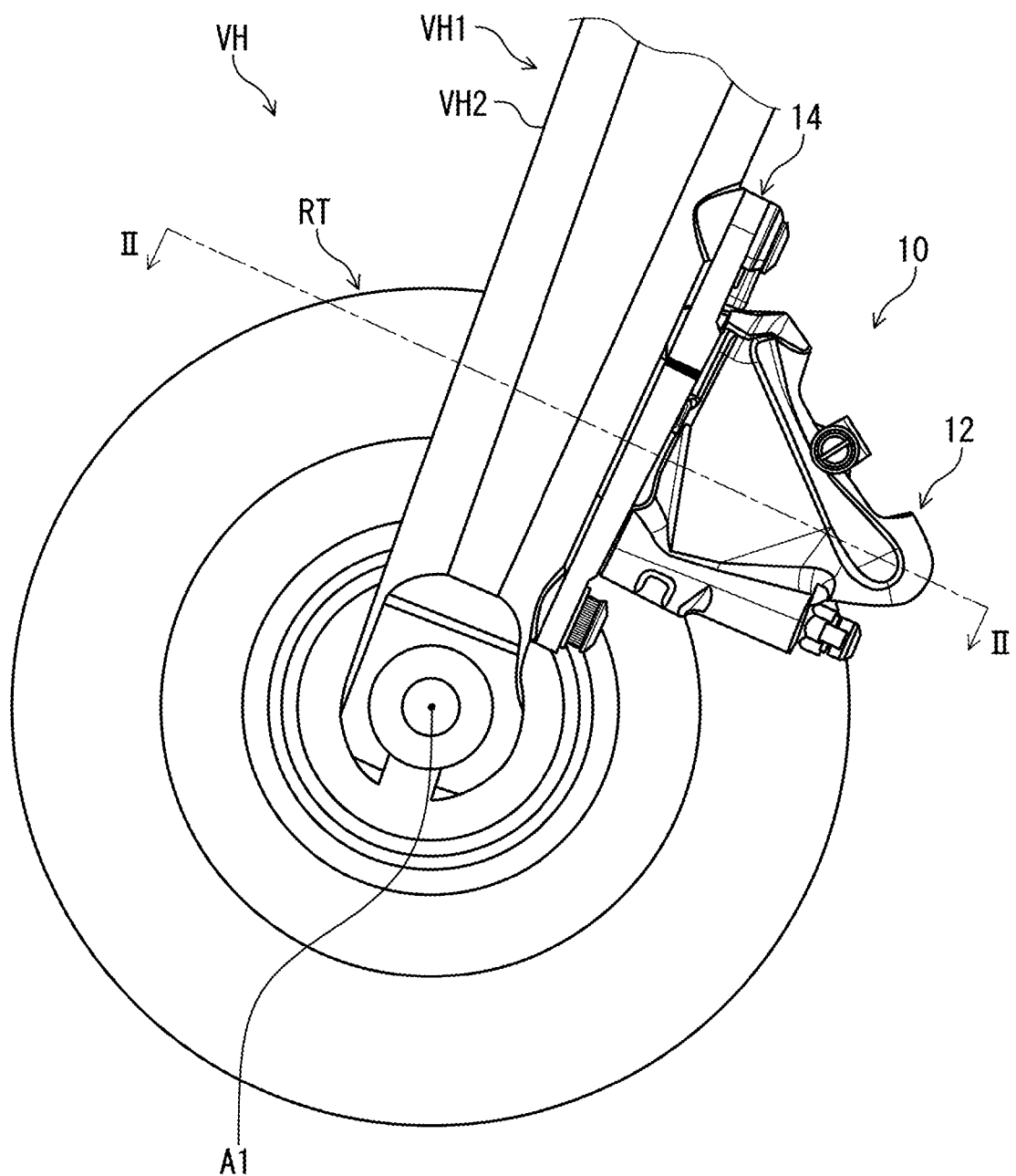
FIG. 1 is a side elevational view of a disc brake caliper in accordance with an embodiment, with a vehicle body and a disc brake rotor.

The embodiment(s) will now be described with reference to the accompanying drawings, wherein like reference numerals designate corresponding or identical elements throughout the various drawings.

First Embodiment

Referring initially to FIG. 1, a disc brake caliper 10 of a human-powered vehicle VH is configured to be mounted to a vehicle body VH1 of the human-powered vehicle VH. The disc brake caliper 10 is configured to apply a braking force to a disc brake rotor RT. The disc brake rotor RT is rotatably mounted to the vehicle body VH1 about a rotational axis A1.

For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VII preferably has a smaller size than that of a four-wheeled automobile. However, the human-powered vehicle VH can have an arbitrary size. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. The disc brake caliper 10 can be applied to mountain bikes, road bikes or any type of human-powered vehicles VH.

In this embodiment, the vehicle body VH1 includes a front fork VH2. The disc brake caliper 10 is configured to be mounted to the front fork VH2 of the vehicle body VH1. However, the disc brake caliper 10 can be mounted to other parts (e.g., a chain stay) of the vehicle body VH1.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle of the human-powered vehicle VH with facing a handlebar. Accordingly, these terms, as utilized to describe the disc brake caliper 10 or other components, should be interpreted relative to the human-powered vehicle VII equipped with the disc brake caliper 10 as used in an upright riding position on a horizontal surface.

The disc brake caliper 10 includes a caliper body 12 and an adapter 14. The caliper body 12 is attached to the vehicle body VH1 of the human-powered vehicle VII via the adapter 14. The caliper body 12 is coupled to the adapter 14. The adapter 14 is coupled to the vehicle body VH1.

Figure 2:
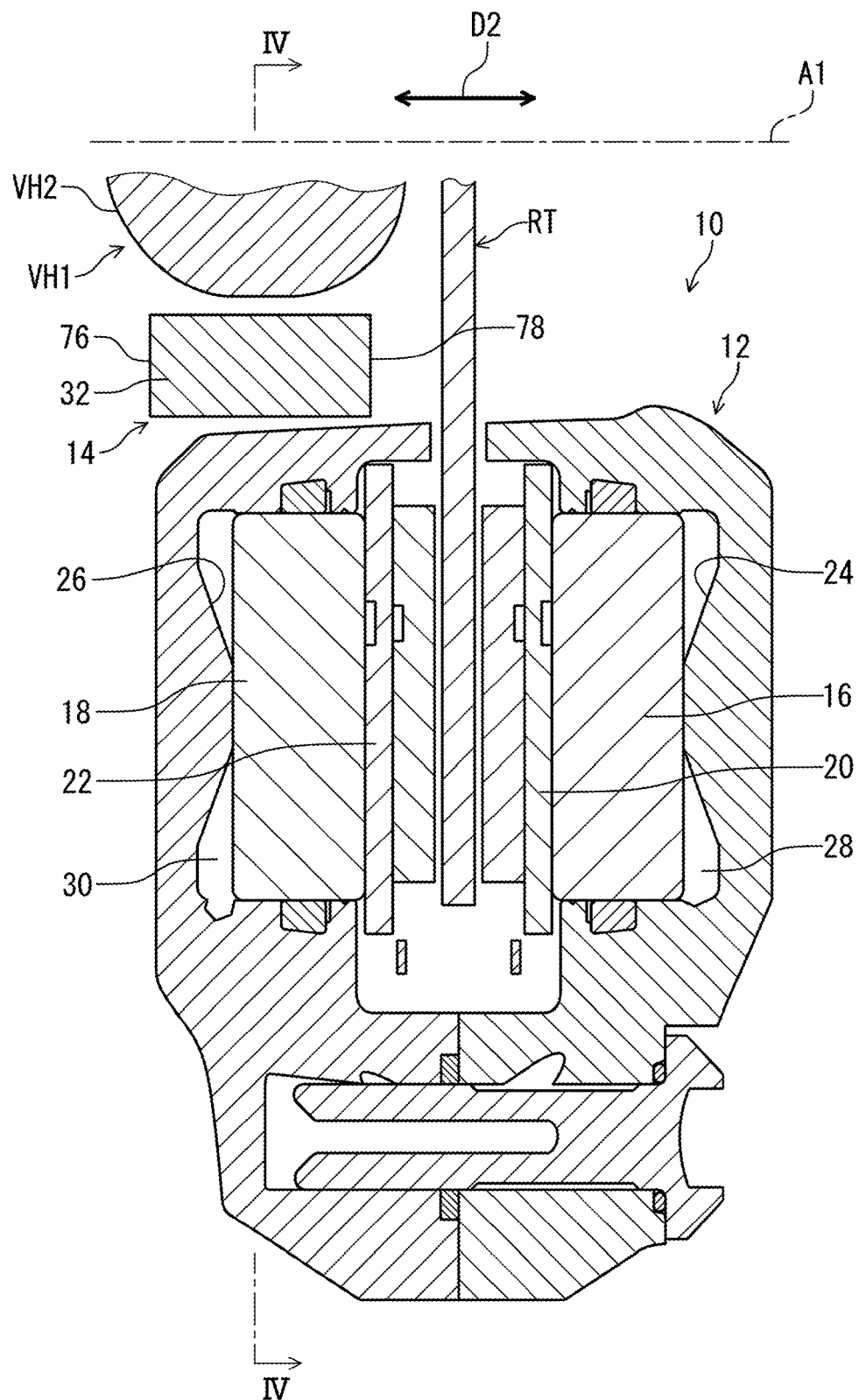
FIG. 2 is a cross-sectional view of the disc brake caliper taken along line II-II of FIG. 1.

As seen in FIG. 2, the disc brake caliper 10 includes a first piston 16, a second piston 18, a first brake pad 20, and a second brake pad 22. The caliper body 12 includes a first cylinder bore 24 and a second cylinder bore 26. The first piston 16 is movably provided in the first cylinder bore 24. The second piston 18 is movably provided in the second cylinder bore 26. The first brake pad 20 and the second brake pad 22 are provided between the first piston 16 and the second piston 18. The first piston 16 and the first cylinder bore 24 define a first hydraulic chamber 28. The second piston 18 and the second cylinder bore 26 define a second hydraulic chamber 30. The first hydraulic chamber 28 and the second hydraulic chamber 30 are configured to be connected to a hydraulic chamber of an operating device with a hydraulic hose.

Figure 3:
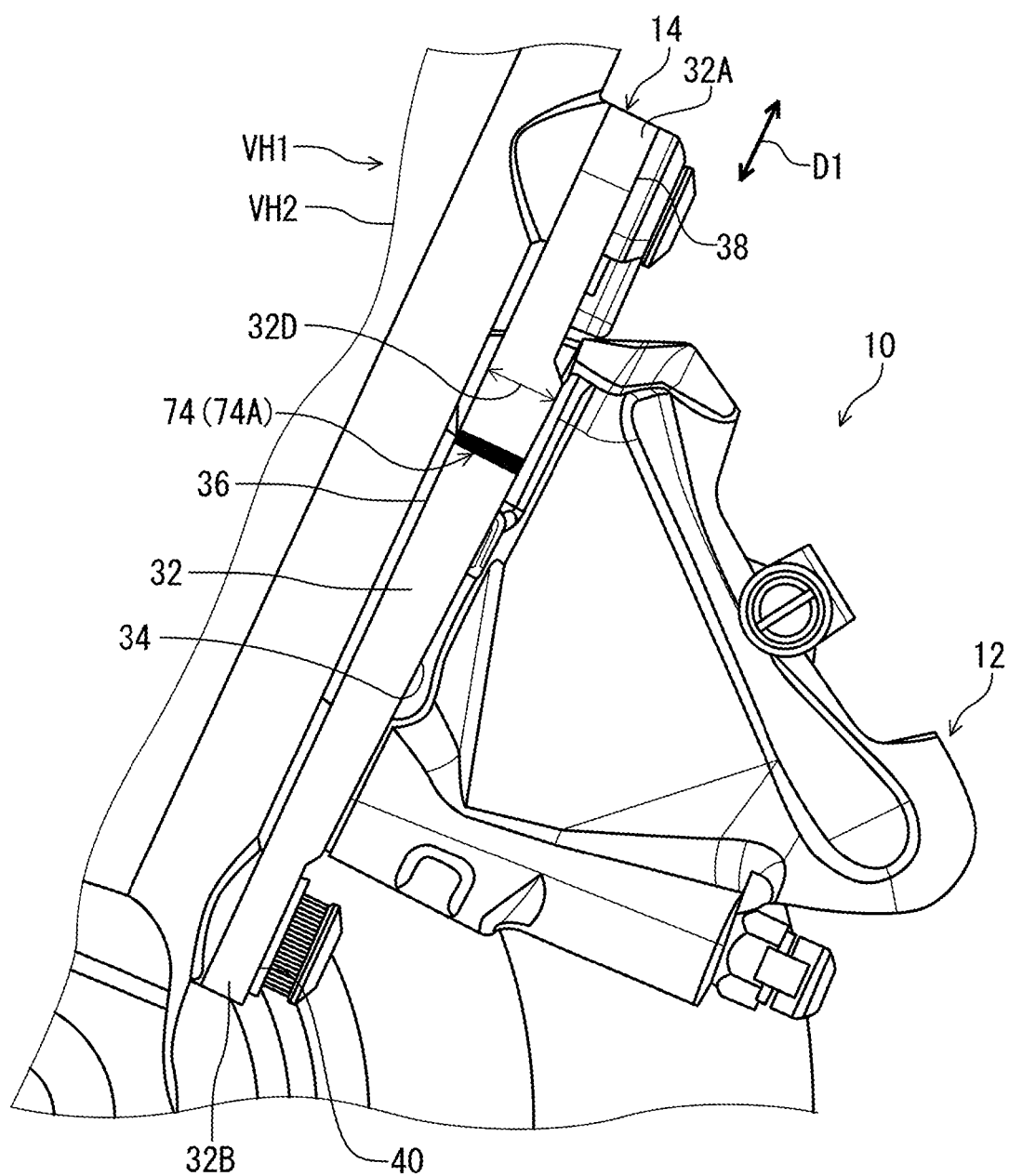
FIG. 3 is a side elevational view of the disc brake caliper attached to the vehicle body.

As seen in FIG. 3, the adapter 14 for the disc brake caliper 10 of the human-powered vehicle VH comprises an adapter body 32. The adapter body 32 has a longitudinal direction D1. The adapter body 32 includes a first longitudinal end 32A and a second longitudinal end 32B. The adapter body 32 extends between the first longitudinal end 32A and the second longitudinal end 32B in the longitudinal direction D1. The adapter body 32 is provided between the caliper body 12 and the vehicle body VH1 in an attachment state where the adapter body 32 is attached to the vehicle body VH1.

The adapter body 32 includes a caliper facing surface 34. The caliper facing surface 34 is configured to face toward the caliper body 12 of the disc brake caliper 10 in the attachment state. The caliper facing surface 34 extends along the longitudinal direction D1.

The adapter body 32 includes a frame facing surface 36. The frame facing surface 36 is configured to face toward the vehicle body VH1 of the human-powered vehicle VH in the attachment state. The frame facing surface 36 is provided on a reverse side of the caliper facing surface 34. The frame facing surface 36 extends along the longitudinal direction D1.

The adapter body 32 includes a first attachment surface 38 and a second attachment surface 40. The first attachment surface 38 is a reverse side of the frame facing surface 36. The second attachment surface 40 is a reverse side of the frame facing surface 36. The caliper facing surface 34 is provided between the first attachment surface 38 and the second attachment surface 40 in the longitudinal direction D1.

In this embodiment, the caliper facing surface 34 is inclined relative to the frame facing surface 36. In other words, the caliper facing surface 34 is non-parallel to the frame facing surface 36. The caliper facing surface 34 is inclined relative to the frame facing surface 36 to decrease a distance 32D between the frame facing surface 36 and the caliper facing surface 34 from the first attachment surface 38 toward the second attachment surface 40. The first attachment surface 38 is parallel to the frame facing surface 36. The second attachment surface 40 is parallel to the frame facing surface 36. However, the caliper facing surface 34 can be parallel to the frame facing surface 36. The first attachment surface 38 can be inclined relative to the frame facing surface 36. The second attachment surface 40 can be inclined relative to the frame facing surface 36.

Figure 4:
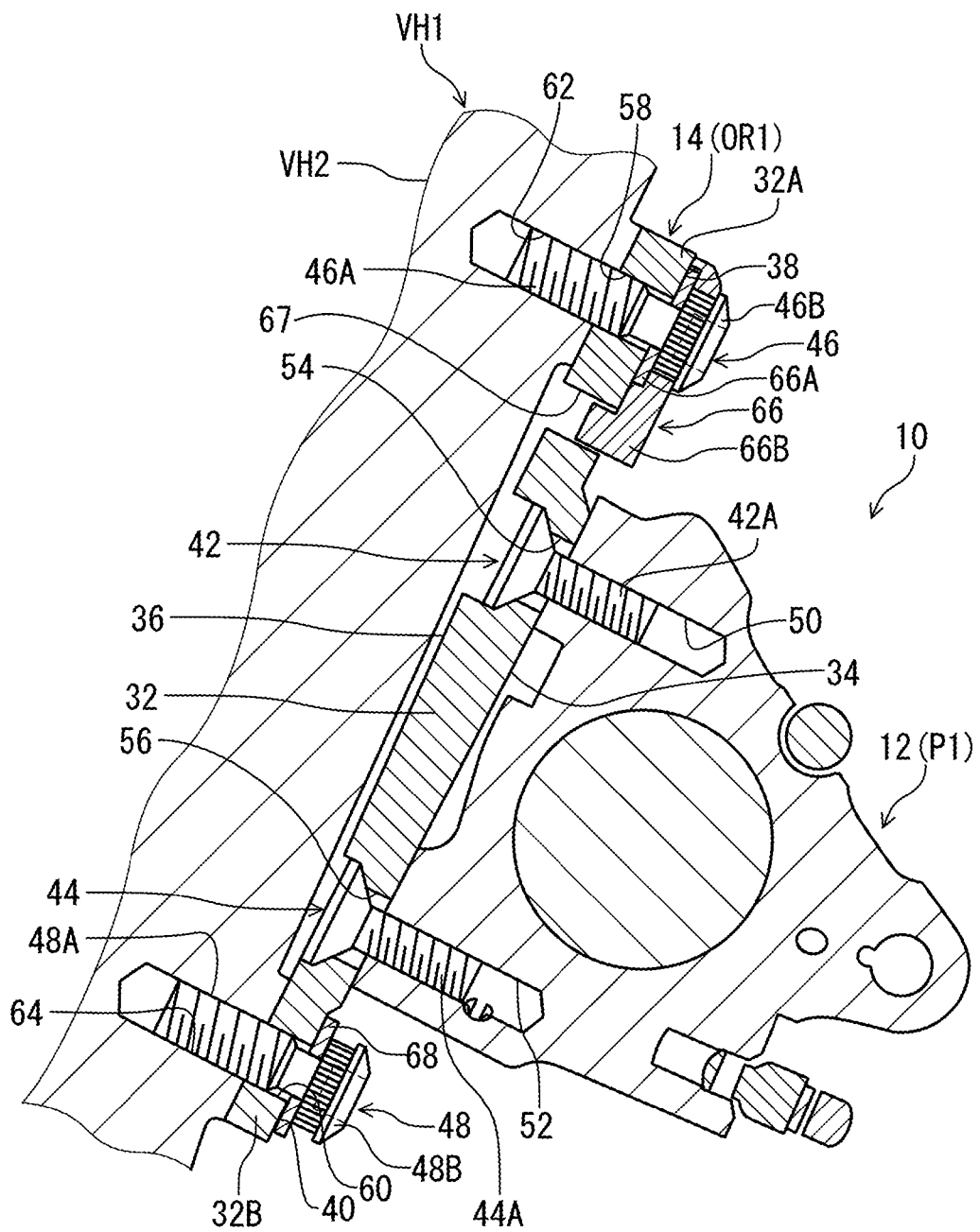
FIG. 4 is a cross-sectional view of the disc brake caliper taken along line IV-IV of FIG. 2 (first orientation).

As seen in FIG. 4, the disc brake caliper 10 includes a first coupling member 42, a second coupling member 44, a first mounting member 46, and a second mounting member 48. Each of the first coupling member 42 and the second coupling member 44 is configured to couple the adapter body 32 to the caliper body 12. Each of the first mounting member 46 and the second mounting member 48 is configured to couple the adapter body 32 to the vehicle body VH1.

The caliper body 12 includes a first threaded hole 50 and a second threaded hole 52. The first coupling member 42 includes a first external thread 42A and is configured to be threadedly engaged in the first threaded hole 50. The second coupling member 44 includes a second external thread 44A and is configured to be threadedly engaged in the second threaded hole 52.

The adapter body 32 includes a first through-hole 54 through which the first coupling member 42 extends to couple the adapter body 32 to the caliper body 12. The adapter body 32 includes a second through-hole 56 through which the second coupling member 44 extends to couple the adapter body 32 to the caliper body 12. The second through-hole 56 is spaced apart from the first through-hole 54 in the longitudinal direction D1. Each of the first through-hole 54 and the second through-hole 56 extends from the frame facing surface 36 to the caliper facing surface 34. The first coupling member 42 is a countersunk screw having a countersunk head. The first coupling member 42 is a countersunk screw having a countersunk head. The first through-hole 54 at least partly has a countersunk shape corresponding to the countersunk head of the first coupling member 42. The second through-hole 56 at least partly has a countersunk shape corresponding to the countersunk head of the second coupling member 44. An inclination between the caliper facing surface 34 and the frame facing surface 36 is absorbed by shapes of the first coupling member 42, the second coupling member 44, the first through-hole 54 and the second through-hole 56.

The adapter body 32 includes a first mounting through-hole 58 through which the first mounting member 46 extends to couple the adapter body 32 to the vehicle body VH1. The adapter body 32 includes a second mounting through-hole 60 through which the second mounting member 48 extends to couple the adapter body 32 to the vehicle body VH1. The second mounting through-hole 60 is spaced apart from the first mounting through-hole 58 in the longitudinal direction D1. The first through-hole 54 and the second through-hole 56 are provided between the first mounting through-hole 58 and the second mounting through-hole 60 in the longitudinal direction D1. The first mounting through-hole 58 extends from the frame facing surface 36 to the first attachment surface 38. The second mounting through-hole 60 extends from the frame facing surface 36 to the second attachment surface 40.

The vehicle body VH1 includes a first threaded hole 62 and a second threaded hole 64. The first mounting member 46 includes a first external thread 46A and is configured to be threadedly engaged in the first threaded hole 62. The second mounting member 48 includes a second external thread 48A and is configured to be threadedly engaged in the second threaded hole 64.

The disc brake caliper 10 includes a first intermediate member 66 and a second intermediate member 68. The first intermediate member 66 is configured to be provided between the adapter body 32 and a first head part 46B of the first mounting member 46. The second intermediate member 68 is configured to be provided between the adapter body 32 and a second head part 48B of the second mounting member 48. The first intermediate member 66 includes a washer 66A and a loose stopper 66B. The loose stopper 66B is configured to lock the first mounting member 46. The adapter body 32 has a recess 67 on the caliper facing surface 34. In this embodiment, the recess 67 is provided as a though-hole extending between the caliper facing surface 34 and the frame facing surface 36. The loose stopper 66B is partly provided in the recess 67. The second intermediate member 68 includes a washer.

Figure 5:
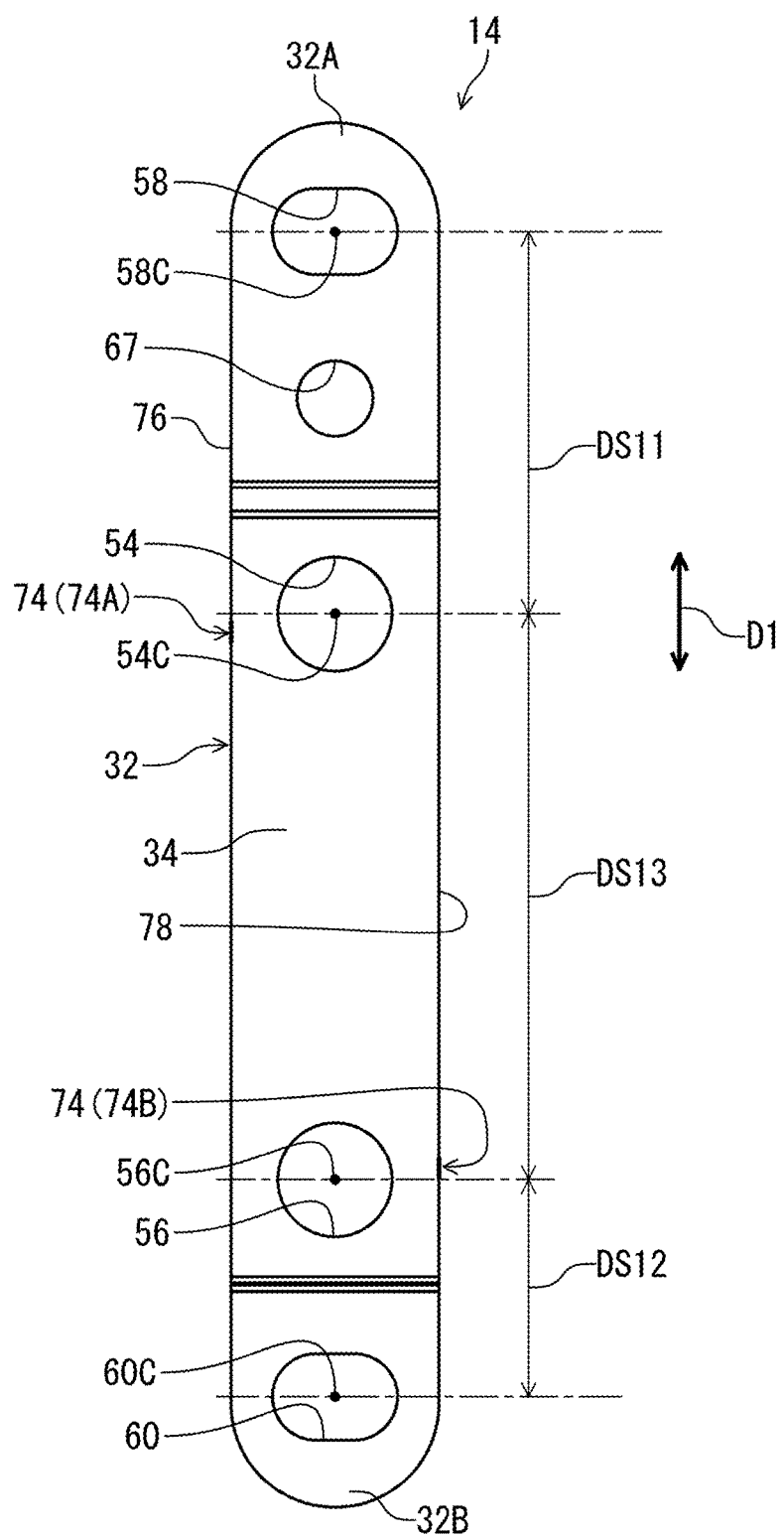
FIG. 5 is an elevational view of an adapter of the disc brake caliper illustrated in FIG. 1.

As seen in FIG. 5, a first hole distance DS11 is defined between a first center 58C of the first mounting through-hole 58 and a first center 54C of the first through-hole 54 in the longitudinal direction D1. A second hole distance DS12 is defined between a second center 60C of the second mounting through-hole 60 and a second center 56C of the second through-hole 56 in the longitudinal direction D1. The first hole distance DS11 is different from the second hole distance DS12. The first center 54C and 58C, and the second center 56C and 60C are lined up on a straight line in the longitudinal direction D1. In this embodiment, the first hole distance DS11 is longer than the second hole distance DS12. However, the first hole distance DS11 is shorter than the second hole distance DS12.

A third hole distance DS13 is defined between the first center 54C of the first through-hole 54 and the second center 56C of the second through-hole 56 in the longitudinal direction D1. The third hole distance DS13 is different from at least one of the first hole distance DS11 and the second hole distance DS12. In this embodiment, the third hole distance DS13 is different from both the first hole distance DS11 and the second hole distance DS12. The third hole distance DS13 is longer than the first hole distance DS11 and the second hole distance DS12. However, the dimensional relationship among the first hole distance DS11, the second hole distance DS12, and the third hole distance DS13 is not limited to this embodiment. The third hole distance DS13 can be equal to at least one of the first hole distance DS11 and the second hole distance DS12.

Figure 6:
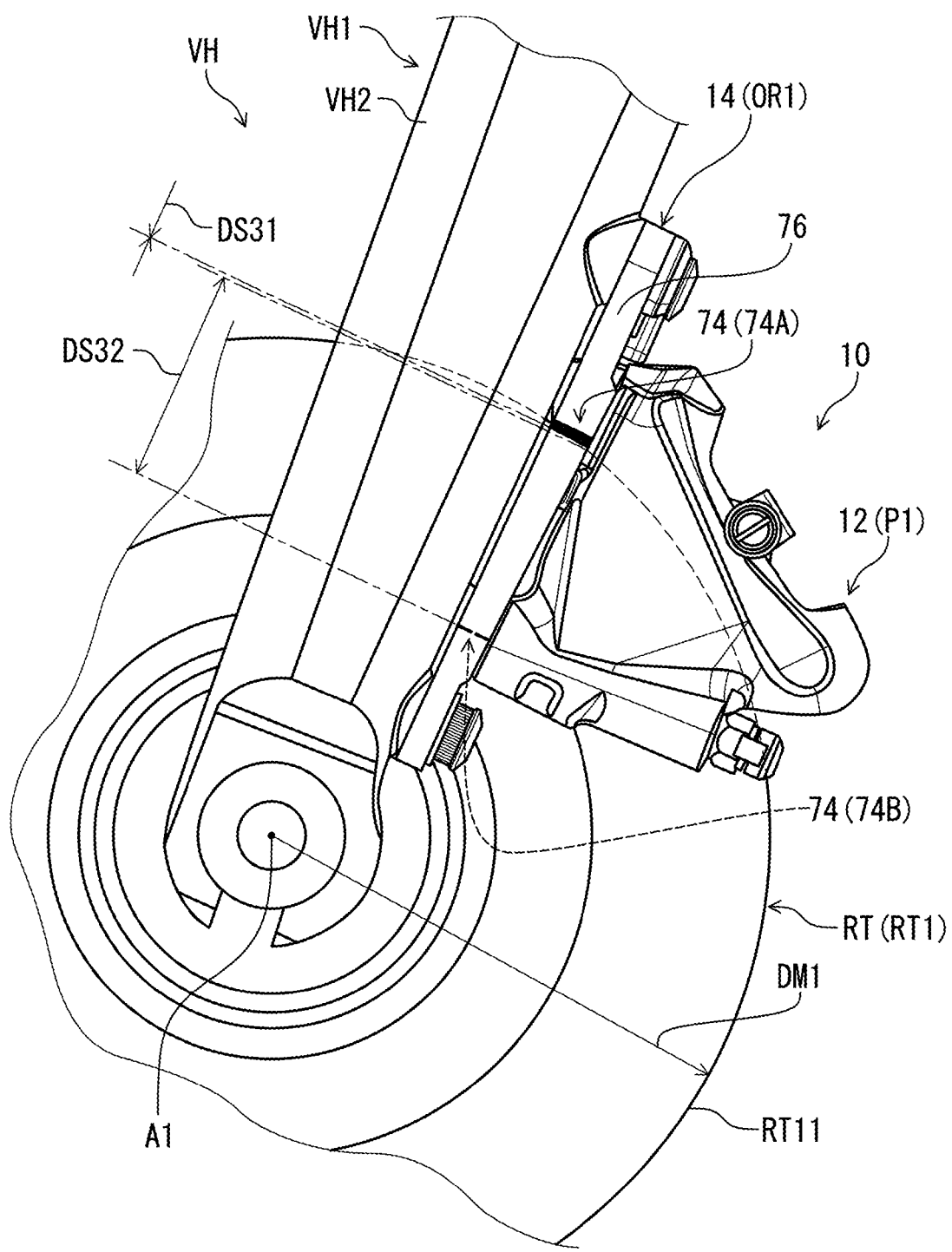
FIG. 6 is a side elevational view of the disc brake caliper attached to the vehicle body (first orientation), with a second disc brake rotor.
Figure 7:
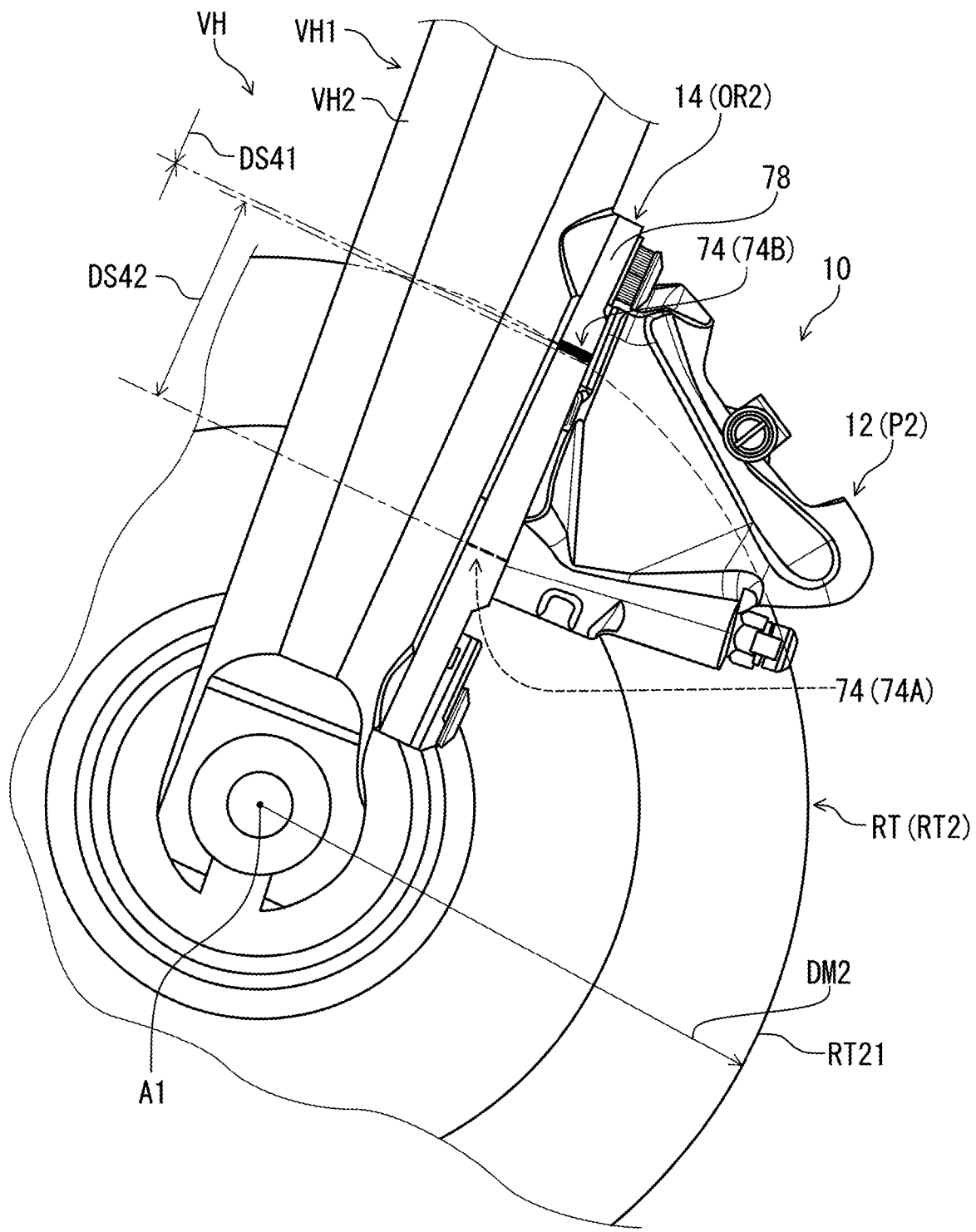
FIG. 7 is a side elevational view of the disc brake caliper attached to the vehicle body (second orientation), with a first disc brake rotor.

As seen in FIGS. 6 and 7, the adapter body 32 is configured to be attached to the vehicle body VH1 of the human-powered vehicle VH in each of a first orientation OR1 (see FIG. 6) in which the caliper body 12 of the disc brake caliper 10 is coupled to the vehicle body VH1 via the adapter body 32 in a first position P1 corresponding to a first disc brake rotor RT1 having a first outer diameter DM1, and a second orientation OR2 (see FIG. 7) in which the caliper body 12 of the disc brake caliper 10 is coupled to the vehicle body VH1 via the adapter body 32 in a second position P2 corresponding to a second disc brake rotor RT2 having a second outer diameter DM2 different from the first outer diameter DM1. In this embodiment, the second outer diameter DM2 is larger than the first outer diameter DM1. However, the second outer diameter DM2 can be smaller than the first outer diameter DM1.

As seen in FIG. 4, in the first orientation OR1, the first coupling member 42 extends through the first through-hole 54 of the adapter body 32 and is threadedly engaged in the first threaded hole 50 of the caliper body 12. In the first orientation OR1, the second coupling member 44 extends through the second through-hole 56 of the adapter body 32 and is threadedly engaged in the second threaded hole 52 of the caliper body 12. In the first orientation OR1, the first mounting member 46 extends through the first mounting through-hole 58 of the adapter body 32 and is threadedly engaged in the first threaded hole 62 of the vehicle body VH1. In the first orientation OR1, the second mounting member 48 extends through the second mounting through-hole 60 of the adapter body 32 and is threadedly engaged in the second threaded hole 64 of the vehicle body VH1.

Figure 8:
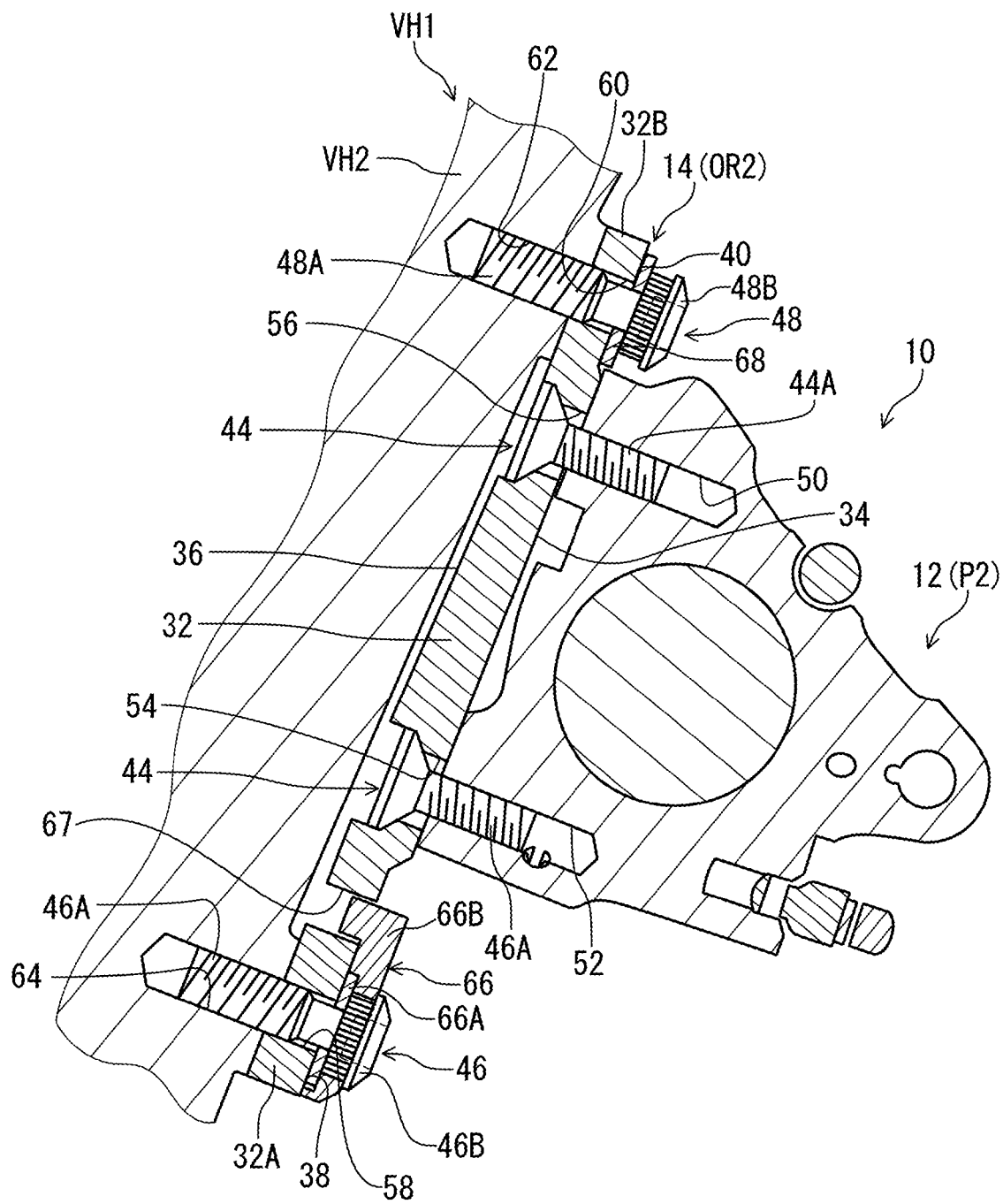
FIG. 8 is a cross-sectional view of the disc brake caliper illustrated in FIG. 7 (second orientation).

As seen in FIG. 8, in the second orientation OR2, the first coupling member 42 extends through the first through-hole 54 of the adapter body 32 and is threadedly engaged in the second threaded hole 52 of the caliper body 12. In the second orientation OR2, the second coupling member 44 extends through the second through-hole 56 of the adapter body 32 and is threadedly engaged in the first threaded hole 50 of the caliper body 12. In the second orientation OR2, the first mounting member 46 extends through the first mounting through-hole 58 of the adapter body 32 and is threadedly engaged in the second threaded hole 64 of the vehicle body VH1. In the second orientation OR2, the second mounting member 48 extends through the second mounting through-hole 60 of the adapter body 32 and is threadedly engaged in the first threaded hole 62 of the vehicle body VH1.

As seen in FIGS. 6 and 7, the adapter 14 for the disc brake caliper 10 of the human-powered vehicle VH comprises an indicator 74. The indicator 74 is configured to indicate a correspondence between an orientation of the adapter body 32 and at least one of the first disc brake rotor RT1 and the second disc brake rotor RT2 in the attachment state where the adapter body 32 is attached to the vehicle body VH1. The indicator 74 is configured to indicate a correspondence between an orientation of the adapter body 32 and at least one of the first disc brake rotor RT1 and the second disc brake rotor RT2 in accordance with a position of the indicator 74 with respect to the at least one of the first disc brake rotor RT1 and the second disc brake rotor RT2, in the attachment state where the adapter body 32 is attached to the vehicle body VH1.

As seen in FIG. 6, the indicator 74 includes a first indicator 74A configured to indicate the correspondence between the orientation of the adapter body 32 and the first disc brake rotor RT1 in a first attachment state where the adapter body 32 is attached to the vehicle body VH1 in the first orientation OR1.

As seen in FIG. 7, the indicator 74 includes a second indicator 74B configured to indicate the correspondence between the orientation of the adapter body 32 and the second disc brake rotor RT2 in a second attachment state where the adapter body 32 is attached to the vehicle body VH1 in the second orientation OR2.

As seen in FIGS. 2 and 5, the adapter body 32 includes a first surface 76. The first surface 76 is configured to face in an axial direction D2 (see FIG. 2) with respect to the rotational axis A1 of the first disc brake rotor RT1 and the second disc brake rotor RT2 in the attachment state. The adapter body 32 includes a second surface 78. The second surface 78 is configured to face in the axial direction D2 (see FIG. 2) with respect to the rotational axis A1 in the attachment state. The second surface 78 is provided on a reverse side of the first surface 76 in the axial direction D2.

As seen in FIG. 5, the first surface 76 extends between the first longitudinal end 32A and the second longitudinal end 32B in the longitudinal direction D1. The second surface 78 extends between the first longitudinal end 32A and the second longitudinal end 32B in the longitudinal direction D1. In this embodiment, the first surface 76 is parallel to the second surface 78. However, the first surface 76 can be non-parallel to the second surface 78.

Figure 9:
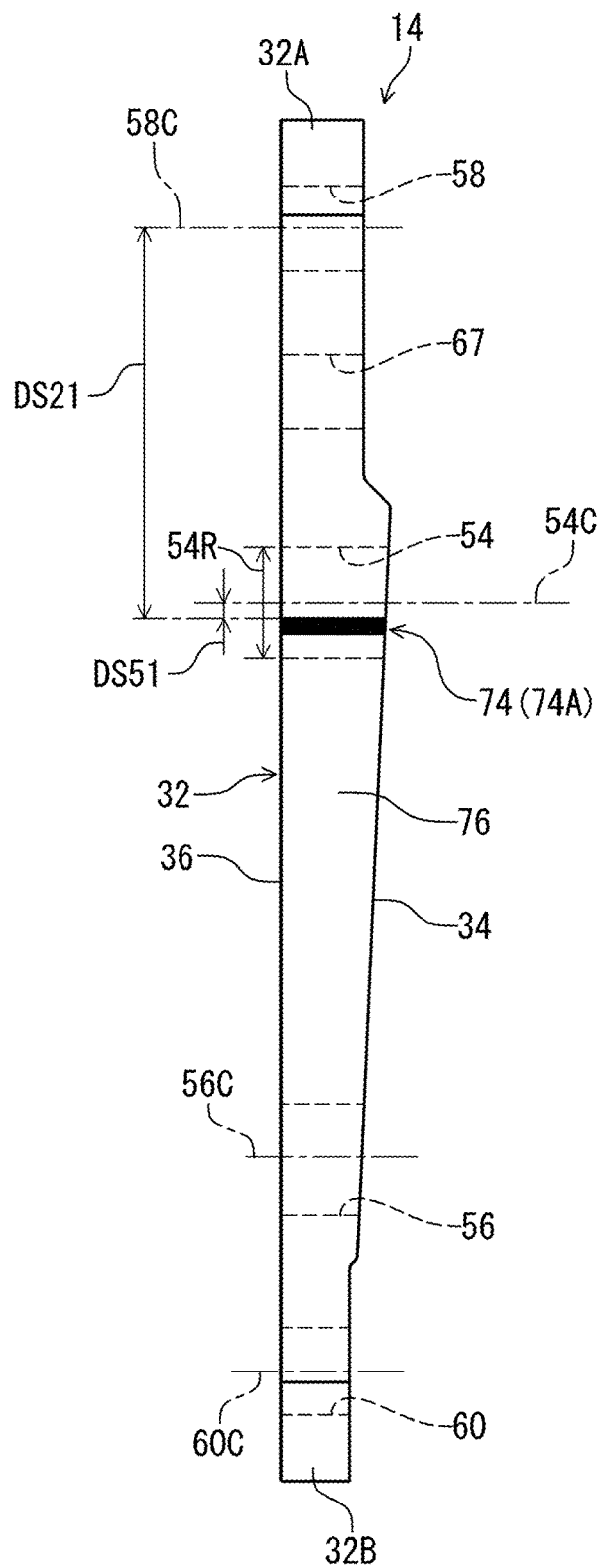
FIG. 9 is a side elevational view of the adapter of the disc brake caliper illustrated in FIG. 1.

As seen in FIG. 9, the first indicator 74A is provided on the first surface 76. A first distance DS21 is defined between the first indicator 74A and the first center 58C of the first mounting through-hole 58 in the longitudinal direction D1.

Figure 10:
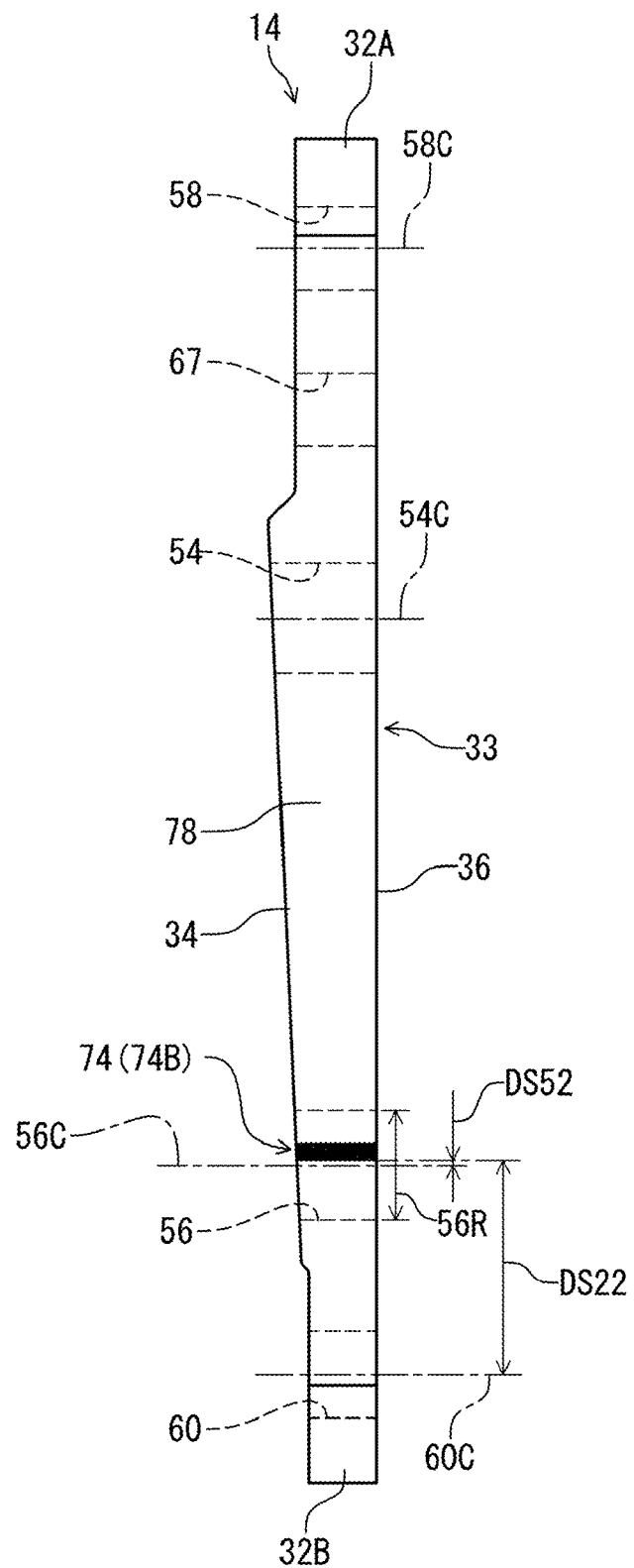
FIG. 10 is another side elevational view of the adapter of the disc brake caliper illustrated in FIG. 1.

As seen in FIG. 10, the second indicator 74B is provided on the second surface 78. A second distance DS22 is defined between the second indicator 74B and the second center of the second mounting through-hole 60 in the longitudinal direction D1. As seen in FIGS. 9 and 10, the first distance DS21 is different from the second distance DS22. In this embodiment, the first distance DS21 is longer than the second distance DS22. However, the first distance DS21 can be shorter than the second distance DS22.

As seen in FIGS. 9 and 10, in this embodiment, the indicator 74 has a color different from a color of the adapter body 32. The indicator 74 includes a line having a color different from the color of the adapter body 32. The line extends between the frame facing surface 36 and the caliper facing surface 34.

As seen in FIG. 9, the first indicator 74A has a color different from a color of the adapter body 32. The first indicator 74A includes a first line having a color different from the color of the adapter body 32. The first line extends between the frame facing surface 36 and the caliper facing surface 34.

As seen in FIG. 10, the second indicator 74B has a color different from a color of the adapter body 32. The second indicator 74B includes a second line having a color different from the color of the adapter body 32. The second line extends between the frame facing surface 36 and the caliper facing surface 34.

As seen in FIG. 6, a first reference distance DS31 is defined between the first indicator 74A and a first reference portion RT11 of the first disc brake rotor RT1 in the longitudinal direction D1 as viewed in the axial direction D2 with respect to the first disc brake rotor RT1 and the second disc brake rotor RT2 in the first attachment state where the adapter body 32 is attached to the vehicle body VH1 in the first orientation OR1. A first additional reference distance DS32 is defined between the second indicator 74B and the first reference portion RT11 of the first disc brake rotor RT1 in the longitudinal direction D1 as viewed in the axial direction D2 in the first attachment state. The first reference distance DS31 is shorter than the first additional reference distance DS32. In this embodiment, the first reference distance DS31 is substantially equal to zero. However, the first reference distance DS31 is not limited to zero.

In this embodiment, the first reference portion RT11 of the first disc brake rotor RT1 includes a first outer periphery of the first disc brake rotor RT1. However, the first reference portion RT11 of the first disc brake rotor RT1 can include another part other than the first outer periphery of the first disc brake rotor RT1.

As seen in FIG. 7, a second reference distance DS41 is defined between the second indicator 74B and the second reference portion RT21 of the second disc brake rotor RT2 in the longitudinal direction D1 as viewed in the axial direction D2 in the second attachment state where the adapter body 32 is attached to the vehicle body VH1 in the second orientation OR2. A second additional reference distance DS42 is defined between the first indicator 74A and the second reference portion RT21 of the second disc brake rotor RT2 in the longitudinal direction D1 as viewed in the axial direction D2 in the second attachment state. The second reference distance DS41 is shorter than the second additional reference distance DS42. In this embodiment, the second reference distance DS41 is substantially equal to zero. However, the second reference distance DS41 is not limited to zero.

In this embodiment, the second reference portion RT21 of the second disc brake rotor RT2 includes a second outer periphery of the second disc brake rotor RT2. However, the second reference portion RT21 of the second disc brake rotor RT2 can include another portion other than the second outer periphery of the second disc brake rotor RT2.

As seen in FIGS. 9 and 10, the indicator 74 is at least partly provided between the first center 58C of the first mounting through-hole 58 and the second center 60C of the second mounting through-hole 60 in the longitudinal direction D1 as viewed in the axial direction D2 with respect to the first disc brake rotor RT1 and the second disc brake rotor RT2. At least one of the first indicator 74A and the second indicator 74B is at least partly provided between the first center 58C of the first mounting through-hole 58 and the second center 60C of the second mounting through-hole 60 in the longitudinal direction D1 as viewed in the axial direction D2. However, the indicator 74 can be at least partly provided outside a range defined between the first center 58C of the first mounting through-hole 58 and the second center 60C of the second mounting through-hole 60 in the longitudinal direction D1 as viewed in the axial direction D2.

As seen in FIG. 9, the first indicator 74A is provided between the first center 58C of the first mounting through-hole 58 and the second center 60C of the second mounting through-hole 60 in the longitudinal direction D1 as viewed in the axial direction D2. However, the first indicator 74A can be at least partly provided outside a range defined between the first center 58C of the first mounting through-hole 58 and the second center 60C of the second mounting through-hole 60 in the longitudinal direction D1 as viewed in the axial direction D2.

As seen in FIG. 10, the second indicator 74B is provided between the first center 58C of the first mounting through-hole 58 and the second center 60C of the second mounting through-hole 60 in the longitudinal direction D1 as viewed in the axial direction D2. However, the second indicator 74B can be at least partly provided outside a range defined between the first center 58C of the first mounting through-hole 58 and the second center 60C of the second mounting through-hole 60 in the longitudinal direction D1 as viewed in the axial direction D2.

As seen in FIGS. 9 and 10, the indicator 74 is at least partly provided between the first center 54C of the first through-hole 54 and the second center 56C of the second through-hole 56 in the longitudinal direction D1 as viewed in the axial direction D2 with respect to the first disc brake rotor RT1 and the second disc brake rotor RT2. At least one of the first indicator 74A and the second indicator 74B is at least partly provided between the first center 54C of the first through-hole 54 and the second center 56C of the second through-hole 56 in the longitudinal direction D1 as viewed in the axial direction D2.

As seen in FIG. 9, the first indicator 74A is provided between the first center 54C of the first through-hole 54 and the second center 56C of the second through-hole 56 in the longitudinal direction D1 as viewed in the axial direction D2. The first indicator 74A is provided in a first longitudinal range 54R of the first through-hole 54. However, the first indicator 74A can be at least partly provided outside a range defined between the first center 54C of the first through-hole 54 and the second center 56C of the second through-hole 56 in the longitudinal direction D1 as viewed in the axial direction D2. The first indicator 74A can be at least partly provided outside the first longitudinal range 54R.

As seen in FIG. 10, the second indicator 74B is provided between the first center 54C of the first through-hole 54 and the second center 56C of the second through-hole 56 in the longitudinal direction D1 as viewed in the axial direction D2. The second indicator 74B is provided in a second longitudinal range 56R of the second through-hole 56. However, the second indicator 74B can be at least partly provided outside a range defined between the first center 54C of the first through-hole 54 and the second center 56C of the second through-hole 56 in the longitudinal direction D1 as viewed in the axial direction D2. The second indicator 74B can be at least partly provided outside the second longitudinal range 56R.

As seen in FIG. 9, a first longitudinal distance DS51 is defined between the first indicator 74A and the first center 54C of the first through-hole 54 in the longitudinal direction D1. As seen in FIG. 10, a second longitudinal distance DS52 is defined between the second indicator 74B and the second center 56C of the second through-hole 56 in the longitudinal direction D1. As seen in FIGS. 9 and 10, the first longitudinal distance DS51 is substantially equal to the second longitudinal distance DS52. However, the first longitudinal distance DS51 can be different from the second longitudinal distance DS52.

Figure 11:
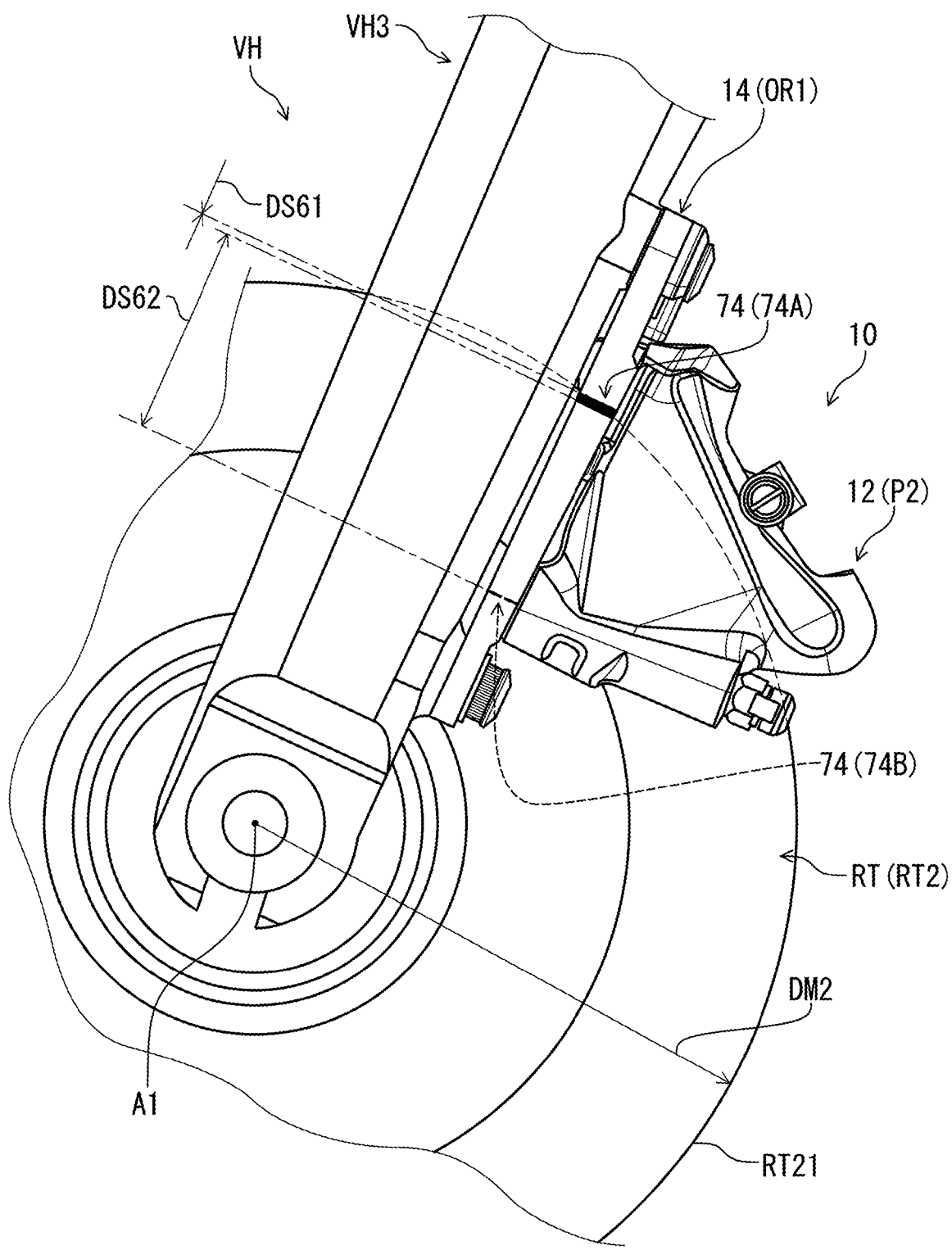
FIG. 11 is a side elevational view of the disc brake caliper attached to the vehicle body (first orientation), with the second disc brake rotor.
Figure 12:
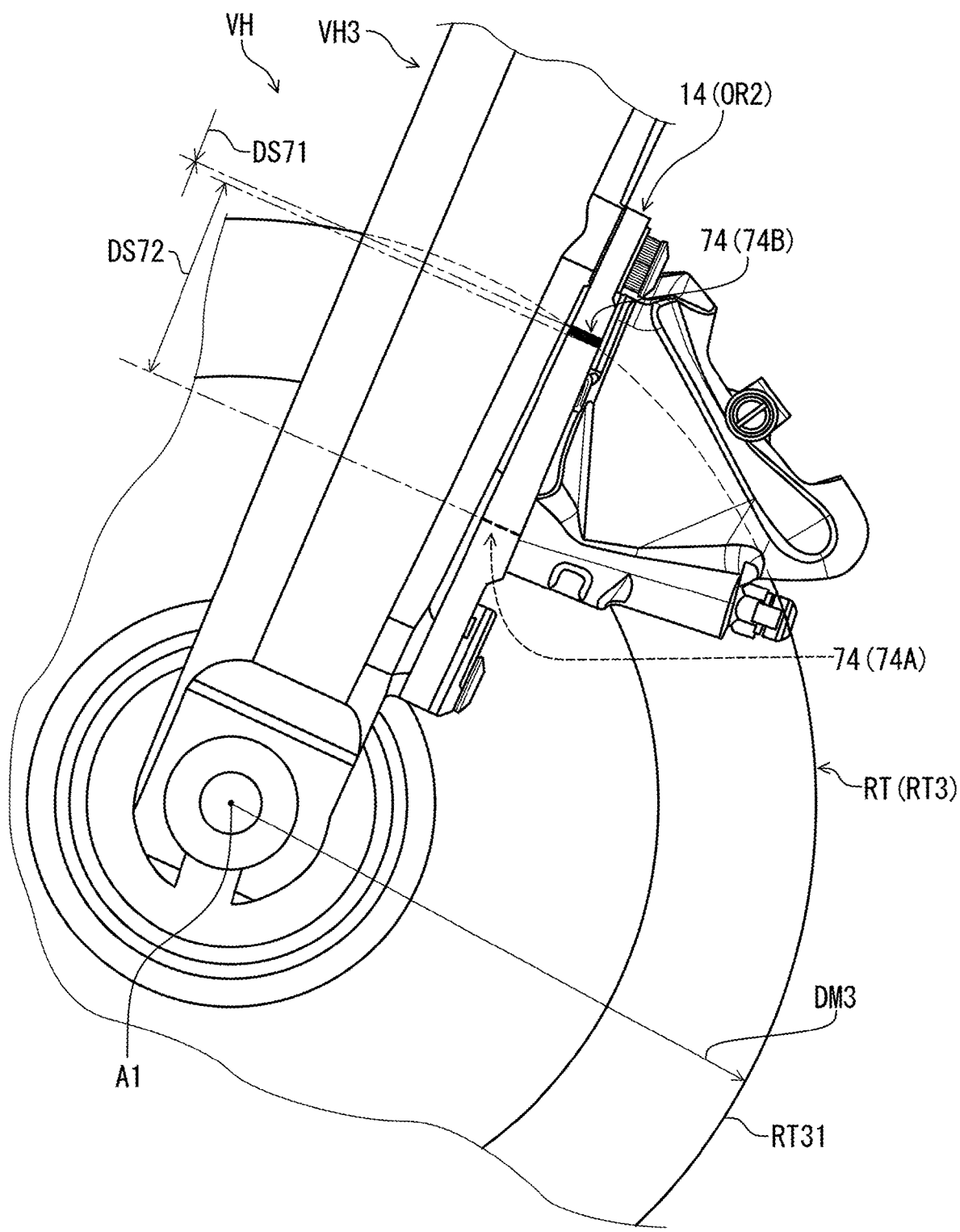
FIG. 12 is a side elevational view of the disc brake caliper attached to the vehicle body (second orientation), with a third disc brake rotor.

As seen in FIGS. 6 and 7, the adapter 14 is configured to be attached to the vehicle body VH1 corresponding to the first disc brake rotor RT1 and the second disc brake rotor RT2. As seen in FIGS. 11 and 12, however, the adapter 14 is configured to be attached to another vehicle body VH3 corresponding to the second disc brake rotor RT2 and a third disc brake rotor RT3. Locations of the first threaded hole 62 and the second threaded hole 64 are different between the vehicle body VH1 and the vehicle body VH3. Specifically, the first threaded hole 62 of the vehicle body VH3 are father from the rotational axis A1 than the first threaded hole 62 of the vehicle body VH1. The second threaded hole 64 of the vehicle body VH3 are father from the rotational axis A1 than the second threaded hole 64 of the vehicle body VH1.

As seen in FIGS. 11 and 12, the adapter body 32 is configured to be attached to the vehicle body VH3 in each of the first orientation OR1 (see FIG. 11) in which the caliper body 12 of the disc brake caliper 10 is coupled to the vehicle body VH3 via the adapter body 32 in the second position P2 corresponding to the second disc brake rotor RT2 having the second outer diameter DM2, and the second orientation OR2 (see FIG. 12) in which the caliper body 12 of the disc brake caliper 10 is coupled to the vehicle body VH3 via the adapter body 32 in a third position P3 corresponding to the third disc brake rotor RT3 having a third outer diameter DM3 different from the first outer diameter DM1 and the second outer diameter DM2. In this embodiment, the third outer diameter DM3 is larger than the first outer diameter DM1 and the second outer diameter DM2. Concretely, the first outer diameter DM1, the second outer diameter DM2 and the third outer diameter DM3 are 140 mm, 160 mm and 180 mm respectively. However, the third outer diameter DM3 can be smaller than at least one of the first outer diameter DM1 and the second outer diameter DM2.

The indicator 74 is configured to indicate a correspondence between an orientation of the adapter body 32 and at least one of the second disc brake rotor RT2 and the third disc brake rotor RT3 in the attachment state where the adapter body 32 is attached to the vehicle body VH1. The indicator 74 is configured to indicate a correspondence between an orientation of the adapter body 32 and at least one of the second disc brake rotor RT2 and the third disc brake rotor RT3 in accordance with a position of the indicator 74 with respect to the at least one of the second disc brake rotor RT2 and the third disc brake rotor RT3, in the attachment state where the adapter body 32 is attached to the vehicle body VH1.

As seen in FIG. 11, the first indicator 74A is configured to indicate the correspondence between the orientation of the adapter body 32 and the second disc brake rotor RT2 in the first attachment state where the adapter body 32 is attached to the vehicle body VH1 in the first orientation OR1.

As seen in FIG. 12, the second indicator 74B is configured to indicate the correspondence between the orientation of the adapter body 32 and the third disc brake rotor RT3 in the second attachment state where the adapter body 32 is attached to the vehicle body VH1 in the second orientation. OR2.

As seen in FIG. 11, a second reference distance DS61 is defined between the first indicator 74A and the second reference portion RT21 of the second disc brake rotor RT2 in the longitudinal direction D1 as viewed in the axial direction D2 with respect to the second disc brake rotor RT2 and the third disc brake rotor RT3 in the first attachment state where the adapter body 32 is attached to the vehicle body VH1 in the first orientation OR1. A second additional reference distance DS62 is defined between the second indicator 74B and the second reference portion RT21 of the second disc brake rotor RT2 in the longitudinal direction D1 as viewed in the axial direction D2 in the first attachment state. The second reference distance DS61 is shorter than the second additional reference distance DS62. In this embodiment, the second reference distance DS61 is substantially equal to zero. However, the second reference distance DS61 is not limited to zero.

As seen in FIG. 12, a third reference distance DS71 is defined between the second indicator 74B and a third reference portion RT31 of the third disc brake rotor RT3 in the longitudinal direction D1 as viewed in the axial direction D2 in the second attachment state where the adapter body 32 is attached to the vehicle body VH1 in the second orientation OR2. A third additional reference distance DS72 is defined between the first indicator 74A and the third reference portion RT31 of the third disc brake rotor RT3 in the longitudinal direction D1 as viewed in the axial direction D2 in the second attachment state. The third reference distance DS71 is shorter than the third additional reference distance DS72. In this embodiment, the third reference distance DS71 is substantially equal to zero. However, the third reference distance DS71 is not limited to zero.

In this embodiment, the third reference portion RT31 of the third disc brake rotor RT3 includes a third outer periphery of the third disc brake rotor RT3. However, the third reference portion RT31 of the third disc brake rotor RT3 can include another portion other than the third outer periphery of the third disc brake rotor RT3.

Figure 13:
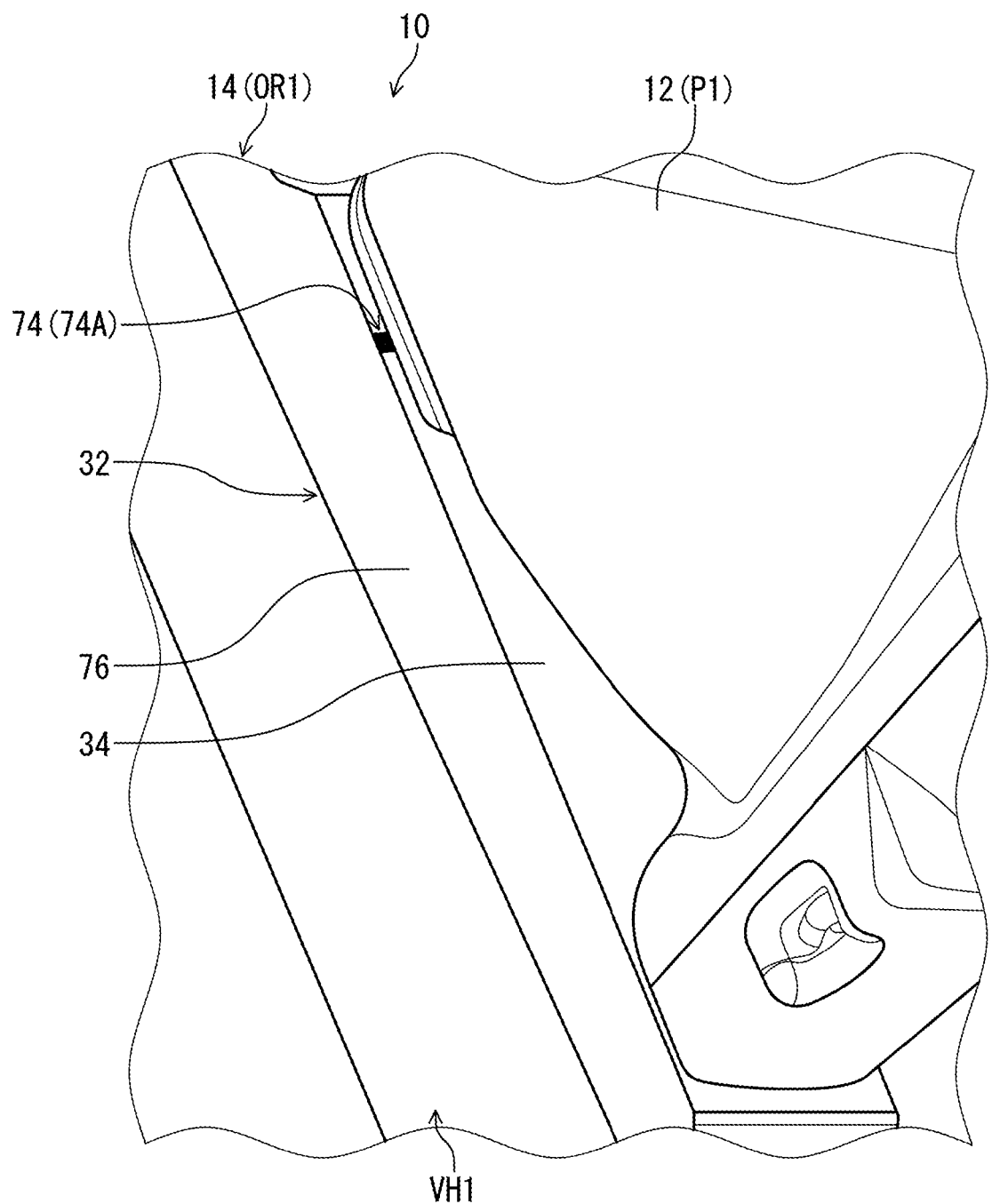
FIG. 13 is a partial enlarged perspective view of the disc brake caliper in accordance with a modification (first orientation).
Figure 14:
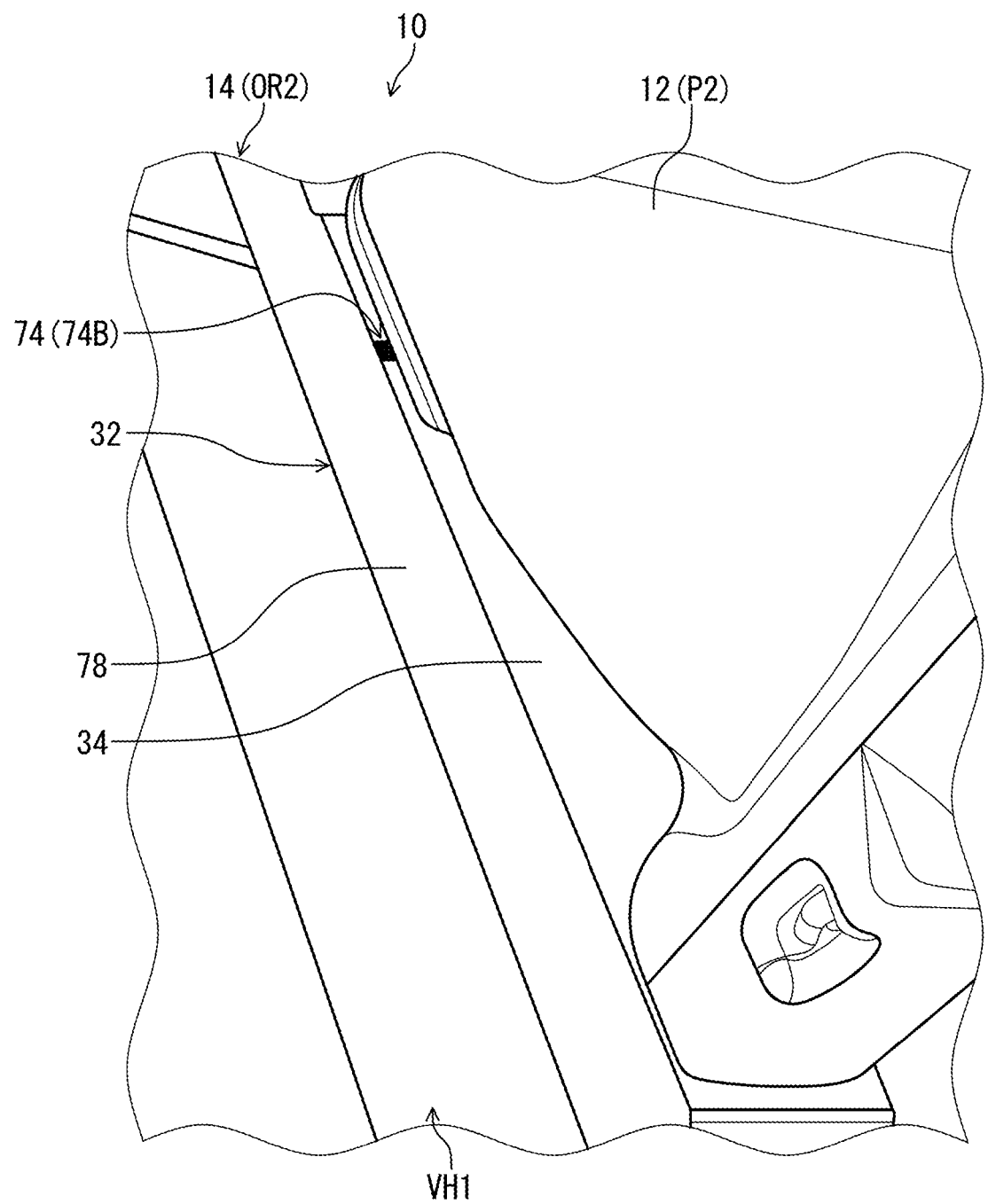
FIG. 14 is a partial enlarged perspective view of the disc brake caliper in accordance with the modification (second orientation).

In the above embodiment, the first indicator 74A is provided on the first surface 76 of the adapter body 32, and the second indicator 74B is provided on the second surface 78 of the adapter body 32. As seen in FIG. 13, however, the first indicator 74A can be provided on the caliper facing surface 34. As seen in FIGS. 13 and 14, the first indicator 74A and the second indicator 74B can be provided on the caliper facing surface 34. Furthermore, the first indicator 74A can be provided on the first surface 76 and the caliper facing surface 34. The second indicator 74B can be provided on the second surface 78 and the caliper facing surface 34.

Figure 15:
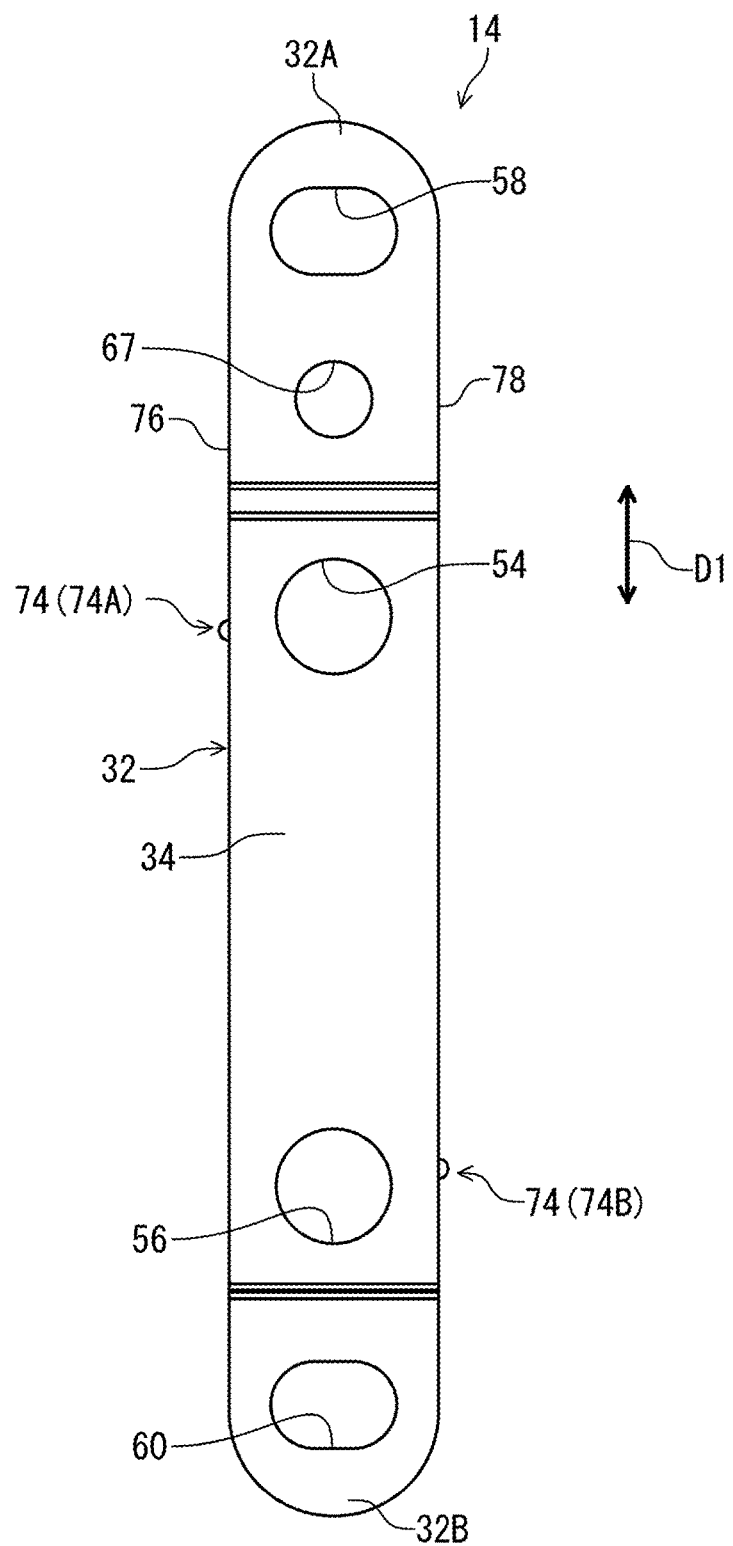
FIG. 15 is an elevational view of the adapter of the disc brake caliper in accordance with another modification.
Figure 16:
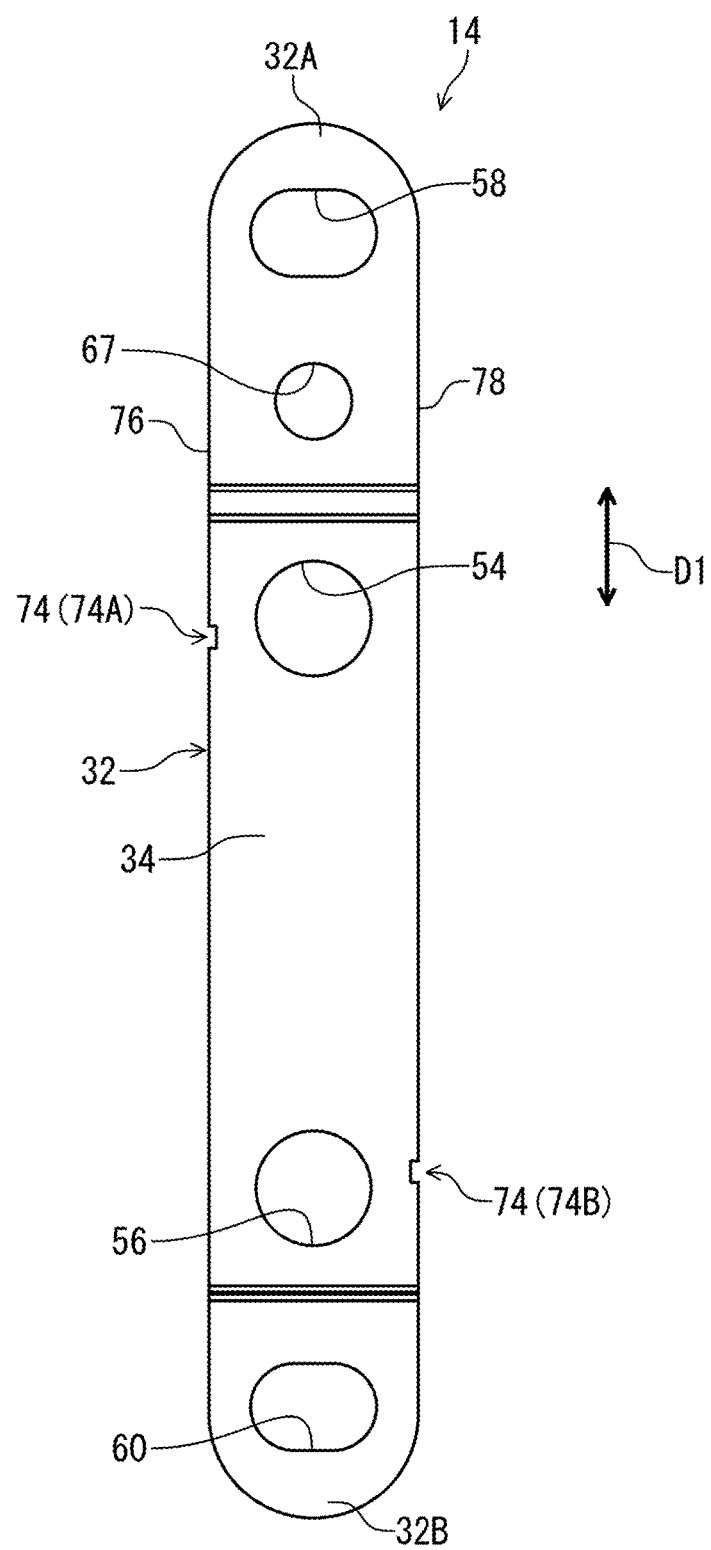
FIG. 16 is an elevational view of the adapter of the disc brake caliper in accordance with another modification.

In the above embodiment, As seen in FIGS. 9 and 10, each of the first indicator 74A and the second indicator 74B includes a line having a color different from a color of the adapter body 32. As seen in FIGS. 15 and 16, however, the indicator 74 can include at least one of a projection and a recess. As seen in FIG. 15, the first indicator 74A can include a projection, and the second indicator 74B can include a projection. As seen in FIG. 16, the second indicator 74B can include a recess, and the second indicator 74B can include a recess. At least one of the first indicator 74A and the second indicator 74B can include both the projection and the recess.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An adapter for a disc brake caliper of a human-powered vehicle, comprising:
    an adapter body configured to be attached to a vehicle body of the human-powered vehicle in each of
        a first orientation in which a caliper body of the disc brake caliper is coupled to the vehicle body via the adapter body in a first position corresponding to a first disc brake rotor having a first outer diameter, and
        a second orientation in which the caliper body of the disc brake caliper is coupled to the vehicle body via the adapter body in a second position corresponding to a second disc brake rotor having a second outer diameter different from the first outer diameter; and
    an indicator configured to indicate a correspondence between a current orientation of the adapter body and at least one of the first disc brake rotor and the second disc brake rotor in accordance with a position of the indicator with respect to at least one of a first outer periphery of the first disc brake rotor and a second outer periphery of the second disc brake rotor, in a current attachment state where the adapter body is attached to the vehicle body, wherein
    the adapter body includes
        a first through-hole through which a first coupling member extends to couple the adapter body to the caliper body, and
        a second through-hole through which a second coupling member extends to couple the adapter body to the caliper body, the second through-hole being spaced apart from the first through-hole in a longitudinal direction of the adapter body,
    the indicator longitudinally extends along a surface of the adapter body in a direction perpendicular to the longitudinal direction of the adapter body, and
    the indicator is at least partly provided between a first center of the first through-hole and a second center of the second through-hole in the longitudinal direction.

2. The adapter according to claim 1, wherein
the indicator includes a first indicator configured to indicate the correspondence between the current orientation of the adapter body and the first outer periphery of the first disc brake rotor in a first attachment state where the adapter body is attached to the vehicle body in the first orientation.

3. The adapter according to claim 2, wherein
the adapter body includes a first surface configured to face in an axial direction with respect to a rotational axis of the first disc brake rotor and the second disc brake rotor in the current attachment state, and
the first indicator is provided on the first surface.

4. The adapter according to claim 2, wherein
the adapter body includes a caliper facing surface configured to face toward the caliper body of the disc brake caliper in the current attachment state, and
the first indicator is provided on the caliper facing surface.

5. The adapter according to claim 2, wherein
the indicator includes a second indicator configured to indicate the correspondence between the current orientation of the adapter body and the second outer periphery of the second disc brake rotor in a second attachment state where the adapter body is attached to the vehicle body in the second orientation.

6. An adapter for a disc brake caliper of a human-powered vehicle, comprising:
    an adapter body configured to be attached to a vehicle body of the human-powered vehicle in each of
        a first orientation in which a caliper body of the disc brake caliper is coupled to the vehicle body via the adapter body in a first position corresponding to a first disc brake rotor having a first outer diameter, and
        a second orientation in which the caliper body of the disc brake caliper is coupled to the vehicle body via the adapter body in a second position corresponding to a second disc brake rotor having a second outer diameter different from the first outer diameter; and
    an indicator configured to indicate a correspondence between a current orientation of the adapter body and at least one of the first disc brake rotor and the second disc brake rotor in a current attachment state where the adapter body is attached to the vehicle body,
    the adapter body including
        a first mounting through-hole through which a first mounting member extends to couple the adapter body to the vehicle body, and
        a second mounting through-hole through which a second mounting member extends to couple the adapter body to the vehicle body,
    the indicator including
        a first indicator configured to indicate the correspondence between the current orientation of the adapter body and the first disc brake rotor in a first attachment state where the adapter body is attached to the vehicle body in the first orientation, and
        a second indicator configured to indicate the correspondence between the current orientation of the adapter body and the second disc brake rotor in a second attachment state where the adapter body is attached to the vehicle body in the second orientation,
    a first distance being defined between the first indicator and a first center of the first mounting through-hole in a longitudinal direction of the adapter body,
    a second distance being defined between the second indicator and a second center of the second mounting through-hole in the longitudinal direction of the adapter body,
    the first distance being different from the second distance,
    the adapter body including
        a first surface configured to face in an axial direction with respect to a rotational axis of the first disc brake rotor and the second disc brake rotor in the current attachment state, and
        a second surface configured to face in the axial direction with respect to the rotational axis in the current attachment state, and
    at least one of
        the first indicator is provided on the first surface, and
        the second indicator is provided on the second surface, wherein
    the first indicator longitudinally extends along a surface of the adapter body in a direction perpendicular to the longitudinal direction of the adapter body.

7. The adapter according to claim 5, wherein
the adapter body includes
    a first surface configured to face in an axial direction with respect to a rotational axis of the first disc brake rotor and the second disc brake rotor in the current attachment state, and
    a second surface configured to face in the axial direction with respect to the rotational axis in the current attachment state, the first indicator is provided on the first surface, and
the second indicator is provided on the second surface.

8. The adapter according to claim 5, wherein
the adapter body includes a caliper facing surface configured to face toward the caliper body of the disc brake caliper in the current attachment state, and
the first indicator and the second indicator are provided on the caliper facing surface.

9. The adapter according to claim 5, wherein
a first reference distance is defined between the first indicator and a first reference portion of the first disc brake rotor in the longitudinal direction as viewed in an axial direction with respect to the first disc brake rotor in the first attachment state where the adapter body is attached to the vehicle body in the first orientation,
a first additional reference distance is defined between the second indicator and the first reference portion of the first disc brake rotor in the longitudinal direction as viewed in the axial direction in the first attachment state, and
the first reference distance is shorter than the first additional reference distance.

10. The adapter according to claim 9, wherein
a second reference distance is defined between the second indicator and the second reference portion of the second disc brake rotor in the longitudinal direction as viewed in the axial direction in the second attachment state where the adapter body is attached to the vehicle body in the second orientation,
a second additional reference distance is defined between the first indicator and the second reference portion of the second disc brake rotor in the longitudinal direction as viewed in the axial direction in the first attachment state, and
the second reference distance is shorter than the second additional reference distance.

11. The adapter according to claim 10, wherein
the first reference portion of the first disc brake rotor includes a first outer periphery of the first disc brake rotor, and
the second reference portion of the second disc brake rotor includes a second outer periphery of the second disc brake rotor.

12. The adapter according to claim 1, wherein
the indicator has a color different from a color of the adapter body.

13. The adapter according to claim 1, wherein
the indicator includes at least one of a projection and a recess.

14. The adapter according to claim 1, wherein
the adapter body includes
 a first mounting through-hole through which a first mounting member extends to couple the adapter body to the vehicle body, and
 a second mounting through-hole through which a second mounting member extends to couple the adapter body to the vehicle body,
the second mounting through-hole is spaced apart from the first mounting through-hole in the longitudinal direction, and
the indicator is at least partly provided between a first center of the first mounting through-hole and a second center of the second mounting through-hole in the longitudinal direction as viewed in an axial direction with respect to the first disc brake rotor and the second disc brake rotor.

15. The adapter according to claim 14, wherein
the indicator includes
 a first indicator configured to indicate the correspondence between the current orientation of the adapter body and the first outer periphery of the first disc brake rotor in a first attachment state where the adapter body is attached to the vehicle body in the first orientation, and
 a second indicator configured to indicate the correspondence between the current orientation of the adapter body and the second outer periphery of the second disc brake rotor in a second attachment state where the adapter body is attached to the vehicle body in the second orientation, and
at least one of the first indicator and the second indicator is at least partly provided between the first center of the first mounting through-hole and the second center of the second mounting through-hole in the longitudinal direction as viewed in the axial direction.

16. The adapter according to claim 14, wherein
the indicator includes
 a first indicator configured to indicate the correspondence between the current orientation of the adapter body and the first outer periphery of the first disc brake rotor in a first attachment state where the adapter body is attached to the vehicle body in the first orientation, and
 a second indicator configured to indicate the correspondence between the current orientation of the adapter body and the second outer periphery of the second disc brake rotor in a second attachment state where the adapter body is attached to the vehicle body in the second orientation,
a first distance is defined between the first indicator and the first center of the first mounting through-hole in the longitudinal direction,
a second distance is defined between the second indicator and the second center of the second mounting through-hole in the longitudinal direction, and
the first distance is different from the second distance.

17. The adapter according to claim 1, wherein
the indicator includes
 a first indicator configured to indicate the correspondence between the current orientation of the adapter body and the first outer periphery of the first disc brake rotor in a first attachment state where the adapter body is attached to the vehicle body in the first orientation, and
 a second indicator configured to indicate the correspondence between the current orientation of the adapter body and the second outer periphery of the second disc brake rotor in a second attachment state where the adapter body is attached to the vehicle body in the second orientation, and
at least one of the first indicator and the second indicator is at least partly provided between the first center of the first through-hole and the second center of the second through-hole in the longitudinal direction as viewed in the axial direction.

18. The adapter according to claim 1, wherein
the indicator includes
 a first indicator configured to indicate the correspondence between the current orientation of the adapter body and the first outer periphery of the first disc brake rotor in a first attachment state where the adapter body is attached to the vehicle body in the first orientation, and a second indicator configured to indicate the correspondence between the current orientation of the adapter body and the second outer periphery of the second disc brake rotor in a second attachment state where the adapter body is attached to the vehicle body in the second orientation, a first longitudinal distance is defined between the first indicator and the first center of the first through-hole in the longitudinal direction, a second longitudinal distance is defined between the second indicator and the second center of the second through-hole in the longitudinal direction, and the first longitudinal distance is substantially equal to the second longitudinal distance.

19. The adapter according to claim 1, wherein the adapter body includes
  a first mounting through-hole through which a first mounting member extends to couple the adapter body to the vehicle body,
  a second mounting through-hole through which a second mounting member extends to couple the adapter body to the vehicle body, the second mounting through-hole being spaced apart from the first mounting through-hole in the longitudinal direction, and
the first through-hole and the second through-hole are provided between the first mounting through-hole and the second mounting through-hole in the longitudinal direction.

20. The adapter according to claim 19, wherein
a first hole distance is defined between a first center of the first mounting through-hole and a first center of the first through-hole in the longitudinal direction,
a second hole distance is defined between a second center of the second mounting through-hole and a second center of the second through-hole in the longitudinal direction, and
the first hole distance is different from the second hole distance.

21. The adapter according to claim 20, wherein
a third hole distance is defined between the first center of the first through-hole and the second center of the second through-hole in the longitudinal direction, and
the third hole distance is different from at least one of the first hole distance and the second hole distance.

22. An adapter for a disc brake caliper of a human-powered vehicle, comprising:
an adapter body configured to be attached to a vehicle body of the human-powered vehicle in each of
  a first orientation in which a caliper body of the disc brake caliper is coupled to the vehicle body via the adapter body in a first position corresponding to a first disc brake rotor having a first outer diameter, and
  a second orientation in which the caliper body of the disc brake caliper is coupled to the vehicle body via the adapter body in a second position corresponding to a second disc brake rotor having a second outer diameter different from the first outer diameter; and
an indicator configured to indicate a correspondence between a current orientation of the adapter body and at least one of the first disc brake rotor and the second disc brake rotor in accordance with a position of the indicator with respect to at least one of a first outer periphery of the first disc brake rotor and a second outer periphery of the second disc brake rotor, in a current attachment state where the adapter body is attached to the vehicle body, wherein the indicator includes a first indicator configured to indicate the correspondence between
the current orientation of the adapter body and the first outer periphery of the first disc brake rotor in a first attachment state where the adapter body is attached to the vehicle body in the first orientation,
the adapter body has a longitudinal direction,
a first reference distance is defined between the first indicator and the first outer periphery of the first disc brake rotor in the longitudinal direction as viewed in an axial direction with respect to the first disc brake rotor in the first attachment state where the adapter body is attached to the vehicle body in the first orientation, and
the first reference distance is substantially equal to zero.

23. The adapter according to claim 5, wherein
a second reference distance is defined between the second indicator and the second outer periphery of the second disc brake rotor in the longitudinal direction as viewed in the axial direction in the second attachment state where the adapter body is attached to the vehicle body in the second orientation, and
the second reference distance is substantially equal to zero.

* * * * *